(12) United States Patent
Yang et al.

(10) Patent No.: US 11,533,751 B2
(45) Date of Patent: *Dec. 20, 2022

(54) RANDOM ACCESS METHOD AND DEVICE, USER EQUIPMENT, AND STORAGE MEDIUM

(71) Applicant: ZTE CORPORATION, Guangdong (CN)

(72) Inventors: Ling Yang, Guangdong (CN); Yajun Zhao, Guangdong (CN); Wei Gou, Guangdong (CN)

(73) Assignee: ZTE Corporation, Shenzhen (CN)

( * ) Notice: Subject to any disclaimer, the term of this patent is extended or adjusted under 35 U.S.C. 154(b) by 58 days.

This patent is subject to a terminal disclaimer.

(21) Appl. No.: 17/175,516

(22) Filed: Feb. 12, 2021

(65) Prior Publication Data

US 2021/0168859 A1    Jun. 3, 2021

Related U.S. Application Data

(63) Continuation of application No. 16/301,263, filed as application No. PCT/CN2017/084248 on May 12, 2017, now Pat. No. 10,959,262.

(30) Foreign Application Priority Data

May 13, 2016    (CN) .......................... 201610322441.2

(51) Int. Cl.
*H04W 74/08*    (2009.01)
*H04W 74/02*    (2009.01)
(Continued)

(52) U.S. Cl.
CPC ......... *H04W 74/02* (2013.01); *H04W 72/042* (2013.01); *H04W 72/0446* (2013.01);
(Continued)

(58) Field of Classification Search
CPC ............... H04W 74/02; H04W 72/042; H04W 72/0446; H04W 72/14; H04W 74/0808;
(Continued)

(56) References Cited

U.S. PATENT DOCUMENTS 8,369,269 B2    2/2013  Nakashima
10,425,973 B2 *  9/2019  Patel ...................... H04W 52/16
(Continued)

FOREIGN PATENT DOCUMENTS

CN    105472762 A    4/2016
WO    2012106843 A1    8/2012

OTHER PUBLICATIONS

International Search Report dated Jul. 27, 2017 for International Application No. PCT/CN2017/084248, 5 pages.
(Continued)

*Primary Examiner* — Lan-Huong Truong
(74) *Attorney, Agent, or Firm* — Knobbe, Martens, Olson & Bear, LLP

(57) ABSTRACT

Provided are a random access method and device, a user equipment and a storage medium. The method includes: determining listen-before-talk (LBT) priority levels for performing an LBT mechanism corresponding to messages transmitted during a random access process, and/or LBT priority levels of an LBT mechanism corresponding to different physical random access channel (PRACH) formats; and transmitting the messages for random access by means of the determined LBT priority levels corresponding to the messages and/or LBT priority levels corresponding to different PRACH formats after successfully performing the LBT mechanism. In such a way, the problem of the need of optimizing random access for a user equipment in the related art is resolved, thereby optimizing random access and improving the random access success rate.

18 Claims, 5 Drawing Sheets

Determine listen-before-talk LBT priority levels for performing an LBT mechanism corresponding to messages transmitted during a random access process, and/or LBT priority levels of an LBT mechanism corresponding to different physical random access channel PRACH formats — S202

Transmit the messages for random access after successfully performing the LBT mechanism, by means of the determined LBT priority levels corresponding to the messages and/or LBT priority levels corresponding to different PRACH formats — S204

(51) Int. Cl.
  *H04W 76/11* (2018.01)
  *H04W 76/27* (2018.01)
  *H04W 72/04* (2009.01)
  *H04W 72/14* (2009.01)
  *H04W 80/02* (2009.01)

(52) U.S. Cl.
  CPC ....... *H04W 72/14* (2013.01); *H04W 74/0808* (2013.01); *H04W 74/0833* (2013.01); *H04W 76/11* (2018.02); *H04W 76/27* (2018.02); *H04W 80/02* (2013.01)

(58) Field of Classification Search
  CPC . H04W 74/0833; H04W 76/11; H04W 76/27; H04W 80/02; H04W 74/085
  See application file for complete search history.

(56) References Cited

U.S. PATENT DOCUMENTS

| | | | |
|---|---|---|---|
| 2014/0036818 A1 | 2/2014 | Koskela et al. | |
| 2014/0204843 A1 | 7/2014 | Larsson | |
| 2016/0050667 A1 | 2/2016 | Papasakellariou | |
| 2016/0309518 A1 | 10/2016 | Patel | |
| 2017/0048880 A1 | 2/2017 | Anderson | |
| 2019/0297644 A1 | 9/2019 | Babaei | |
| 2020/0120646 A1* | 4/2020 | Dinan | H04L 5/0053 |

OTHER PUBLICATIONS

Written Opinion of the International Searching Authority dated Jul. 27, 2017 for International Application No. PCT/CN2017/084248, 4 pages.
ZTE, "Further Consideration on Mapping of LBT Priority Classes," 3GPP TSG-RAN WG2#92 R2-156231, Nov. 20, 2015.
Ericsson, et al., "Mapping between QCIs and LBT Priority Classes", 3GPP TSG-RAN WG2#92 R2-156693, Nov. 20, 2015.
CMCC., "Mapping of QCI to LBT Priority Class," 3GPP TSG-RAN WG2 Meeting #93 R2-161302, Feb. 19, 2016.
3GPP TSG-RAN WG2#93, St. Julian, Malta, Date Feb. 15-19, 2016, Title "Mapping of QCI to LBT priority class"; R2-161302 (Year: 2016).

* cited by examiner

RANDOM ACCESS METHOD AND DEVICE, USER EQUIPMENT, AND STORAGE MEDIUM

CROSS-REFERENCE TO RELATED APPLICATIONS

The present application is a continuation of and claims benefit of priority to U.S. non-Provisional application Ser. No. 16/301,263 titled "RANDOM ACCESS METHOD AND DEVICE, USER EQUIPMENT, AND STORAGE MEDIUM" and filed on Nov. 13, 2018, which claims priority to International Patent Application No. PCT/CN2017/084248, filed May 12, 2017, and Chinese Patent Application No. 201610322441.2, filed May 13, 2016, which are hereby incorporated by reference in their entireties as though fully and completely set forth herein.

TECHNICAL FIELD

The present disclosure relates to the field of communications and, in particular, to a random access method and device, a user equipment (UE) and a storage medium.

BACKGROUND

With a rapid growth of data services, the data transmission pressure on a carrier of a licensed spectrum is also increasing. Therefore, using a carrier of an unlicensed spectrum to share the data traffic in the licensed carrier becomes an important evolution direction of the subsequent development of Long Term Evolution (LTE). The unlicensed spectrum has the following characteristics: free/low fees, low access requirements, low costs, large available bandwidth, resource sharing and so on.

In the research on the standardization of the Licensed Assisted Access (LAA), the random access process is being studied as an important topic. The introducing of the random access process into the LAA secondary cell (SCell) is aimed for a scenario where the primary cell (PCell) and the SCell are non-co-sited and the PCell and SCell are not in the same time advance group (TAG). The difference in paths that SCell and the PCell go through causes different time advance (TA) values. In view of this, the random access supported on the SCell has become inevitable.

In combination with the characteristics of the LAA, since the uplink or downlink traffic is different, the LAA system does not have a fixed number of uplink/downlink subframes. In addition, the introducing of the listen-before-talk (LBT) mechanism to the LAA makes time domain resources and/or frequency domain resources of the semi-static configured physical random access channel (PRACH) no longer applicable for the LAA scenario in the existing art.

The problem caused due to the combination of the characteristics of the LAA and the random access process technology in the existing art further includes that when a PDCCH order triggers the random access process on a subframe n in the existing art, the UE sends, according to a specific timing relationship n+k (k≥6), a preamble on a first PRACH resource after n+k. Apparently, in the dynamic uplink and downlink subframe structure, using the timing relationship in the related art may cause the UE fail to wait for the coming of available PRACH resources, thereby increasing the access delay. Furthermore, the number of preambles available for the non-contention based random access hardly meets the need of a scenario where multiple UEs simultaneously needs to randomly access.

Therefore, based on the LAA scenario characteristics, the problem of the need of optimizing random access for the UE needs to be resolved.

SUMMARY

Embodiments of the present disclosure provide a random access method and device, a user equipment (UE) and a storage medium to at least resolve the problem in the related art of the need of optimizing random access for the UE.

An embodiment of the present disclosure provides a random access method. The method includes: determining listen-before-talk (LBT) priority levels for performing an LBT mechanism corresponding to messages transmitted during a random access process, and/or LBT priority levels of an LBT mechanism corresponding to different physical random access channel (PRACH) formats; and transmitting the messages for random access by means of the determined LBT priority levels corresponding to the messages and/or LBT priority levels corresponding to different PRACH formats after successfully performing the LBT mechanism.

Preferably, an LBT priority level order corresponding to the messages transmitted during the random access process includes one of the following: Msg0>Msg1>Msg2; Msg0>Msg2>Msg1; Msg1>Msg0>Msg2; Msg1>Msg2>Msg0; Msg2>Msg1>Msg0; Msg2>Msg0>Msg1; Msg1>Msg2>Msg3>Msg4; Msg1>Msg2>Msg4>Msg3; Msg1>Msg3>Msg2>Msg4; Msg1>Msg3>Msg4>Msg2; Msg1>Msg4>Msg2>Msg3; Msg1>Msg4>Msg3>Msg2; Msg2>Msg1>Msg3>Msg4; Msg2>Msg1>Msg4>Msg3; Msg2>Msg3>Msg1>Msg4; Msg2>Msg3>Msg4>Msg1; Msg2>Msg4>Msg1>Msg3; Msg2>Msg4>Msg3>Msg1; Msg3>Msg1>Msg2>Msg4; Msg3>Msg1>Msg4>Msg2; Msg3>Msg2>Msg1>Msg4; Msg3>Msg2>Msg4>Msg1; Msg3>Msg4>Msg1>Msg2; Msg3>Msg4>Msg2>Msg1; Msg4>Msg1>Msg2>Msg3; Msg4>Msg1>Msg3>Msg2; Msg4>Msg2>Msg1>Msg3; Msg4>Msg2>Msg3>Msg1; Msg4>Msg3>Msg2>Msg1; and Msg4>Msg3>Msg1>Msg2; where Mgs0 is used for a base station to indicate a preamble transmitted by a user equipment (UE) and/or for transmitting a PRACH time-frequency domain resource message of the preamble, Mgs1 is used for the UE to transmit a preamble message to the base station, Mgs2 is used for the base station to transmit a response message to the UE, Mgs3 is used for the UE to transmit a request message to the base station, and Mgs4 is used by the base station to transmit a contention resolution result message to the UE.

Preferably, a preamble set to which the preamble transmitted in the Msg1 message belongs includes: a third preamble set for contention based random access and a fourth preamble set for non-contention based random access, where the third preamble set and the fourth preamble set form a second preamble set.

Preferably, in a case that the number of elements in the second preamble set is unchanged, the number of elements in the fourth preamble set is increased or decreased by decreasing or increasing the number of elements in the third preamble set; or on a premise that the number of elements in the second preamble set is extended to obtain a first preamble set, the number of elements in the fourth preamble set is increased while the number of the third preamble is kept unchanged by adding the number of newly added preambles in the second preamble set to the fourth preamble set; and on a premise that the number of elements in the second preamble set is extended to obtain the first preamble set, the number of elements in the third preamble set and/or the number of elements in the fourth preamble set are configured via signaling according to an application scenarios; where the signaling includes high-layer RRC signaling or physical layer DCI signaling.

Preferably, time domain resources or candidate PRACH time domain resources for transmitting the Mgs1 are determined by using at least one of the following parameters: a PRACH time domain position pattern, a period or a period set in which the PRACH time domain resources appears, an offset of the PRACH time domain position in the period, a PRACH time window start position, a period in which the PRACH time window appears, a PRACH time window length, a time domain resource start position in the PRACH time window, a time domain resource interval in the PRACH time window, a time domain resource end position in the PRACH time window, and the number of time domain resources in the PRACH time window.

Preferably, time domain resources or candidate PRACH time domain resources for transmitting the Mgs1 or the parameters for determining the time domain resources are determined by at least one of the following manners: high-layer radio resource control (RRC) signaling configuration, a physical layer downlink control information (DCI) signaling notification, a combination of the high-layer RRC signaling configuration and the physical layer DCI signaling notification, and a predetermined implication.

Preferably, the physical layer DCI signaling notification includes: configuring PRACH time domain resources or candidate PRACH time domain resources or the parameters for determining the time domain resources via first physical layer DCI signaling, and triggering enabling of the configured PRACH time domain resources or candidate PRACH time domain resources or the parameters for determining the time domain resources via second DCI signaling.

Preferably, the combination of the high-layer RRC signaling configuration and the physical layer DCI signaling notification includes: configuring PRACH time domain resources or candidate PRACH time domain resources or the parameters for determining the time domain resources via the high-layer RRC signaling, and triggering enabling of the configured PRACH time domain resources or candidate PRACH time domain resources or the parameters for determining the time domain resources via the DCI signaling.

Preferably, the predetermined implication includes: triggering enabling of the configured PRACH time domain resources or candidate PRACH time domain resources or the parameters for determining the time domain resources at least one of the following positions: a downlink transmission burst end position; a position determined by a subframe n transmitted by a physical downlink control channel (PDCCH) order and a predetermined timing relationship between n and a triggering position; a predetermined uplink subframe position; a predetermined uplink subframe position after the downlink transmission burst; a specific uplink subframe in an uplink transmission burst; an uplink transmission burst; and a subframe position corresponding for successfully performing the listen-before-talk (LBT) mechanism on the uplink.

Preferably, the predetermined timing relationship includes: n+k, wherein n is a subframe position of the subframe transmitted by the physical downlink control channel (PDCCH) order, and k is a positive integer greater than or equal to 1 or k is a positive integer greater than or equal to 4.

Preferably, k is determined by at least one of the following manners: a physical layer DCI signaling notification, a high-layer RRC signaling notification, and a pre-agreement by the base station and the UE.

Preferably, the predetermined uplink subframe position includes at least one of the following: a first uplink subframe, a second uplink subframe, a first uplink subframe in the uplink transmission burst, a second uplink subframe in the uplink transmission burst, an uplink subframe whose subframe index is an even number in the uplink transmission burst, an uplink subframe whose subframe index is an odd number in the uplink transmission burst, and an uplink subframe pre-agreed by the base station and the UE.

Optionally, frequency domain resources for transmitting the Mgs1 are determined at least one of the following manners: high-layer radio resource control (RRC) signaling configuration, a physical layer downlink control information (DCI) signaling notification, and a combination of the high-layer RRC signaling configuration and the physical layer DCI signaling notification.

Preferably, a parameter for determining the frequency domain resources includes at least one of the following: a position index of a frequency domain start physical resource block (PRB) or a resource element (RE), a position index set of the frequency domain start physical resource block (PRB) or the resource element (RE), a frequency domain interval, frequency domain repetition times z, frequency domain repetition times set, and the number of PRBs included in frequency domain repetitions and/or the number of REs included in frequency domain repetitions.

Preferably, the listen-before-talk (LBT) mechanism is performed before transmitting the Mgs1; and a first indication message is transmitted to the base station when the LBT mechanism is successfully performed, where the first indication message is used for indicating that the UE performs the LBT mechanism successfully or unsuccessfully; or a second indication message is transmitted to the base station when the LBT mechanism is unsuccessfully performed, where the second indication message is used for instructing an MAC layer not to perform a counter accumulation operation on a PreambleTransMax.

Preferably, a predetermined time window for the UE to receive the Mgs2 is extended to obtain an extended time window; and the Mgs2 is received in the extended time window.

Preferably, the predetermined time window for the UE to receive the Mgs2 is extended to obtain an extended time window in at least one of the following manners: extending the predetermined time window for the UE to receive the Mgs2 by dynamically indicating a time start point at which the UE receives the Mgs2 to obtain an extended time window of subframes n+k to n+k+L+RA-ResponseWindowSize, where n is a subframe position of a subframe for the UE to transmit the Mgs1, n+k is the time start point at which the UE receives the Mgs2, L is a predetermined time length, and RA-ResponseWindowSize is a length of the predetermined time window; extending the predetermined time window for the UE to receive the Mgs2 to obtain the extended time window by increasing the length of the predetermined time window; extending the predetermined time window for the UE to receive the Mgs2 to obtain the extended time window by adding an additional time window for receiving the Mgs2; and extending the predetermined time window for the UE to receive the Mgs2 to obtain the extended time window by increasing an additional number of times to receive the Mgs2.

Preferably, L, k and RA-ResponseWindowSize are obtained by at least one of the following manners: high-layer radio resource control (RRC) signaling, physical layer downlink control information (DCI) signaling, and a pre-agreement by the base station and the UE.

Preferably, a third indication message is transmitted to a media access control (MAC) layer when the UE fails to receive the Mgs2, where the third indication message is used for instructing the UE not to raise a power for transmitting the preamble or instructing the MAC layer not to perform a counter accumulation operation on the PreambleTransMax.

Preferably, the Mgs2 is received from the base station after the Mgs1 is transmitted to the base station, where the Mgs2 carries a time advance (TA), an uplink grant (UL grant), a preamble index, and a temporary cell radio network temporary identifier (TC-RNTI).

Preferably, the Mgs2 further carries at least one of the following: a position of a time domain subframe for transmitting an Msg3 message, a position set of time domain subframes for transmitting the Msg3 message, a time window for transmitting the Msg3 message, time domain resources and offset for transmitting the Msg3 message at a start of the time window for transmitting the Msg3 message, an interval of time domain resources for transmitting the Msg3 message in the time window for transmitting the Msg3 message, the number of times for transmitting the Msg3 message, the number of time domain resources for transmitting an Msg3, and a predetermined timing relationship value between time domain resources for the UE to receive the Mgs2 transmitted by the base station and time domain resources for the UE to transmit the Msg3 message.

Preferably, the predetermined timing relationship value between time domain resources for the UE to receive the Mgs2 transmitted by the base station and time domain resources for the UE to transmit the Msg3 message includes: n+k2, where k2 is a value greater than or equal to 1, or k2 is a value greater than or equal to 4.

Preferably, the PRACH format includes: format 0, format 1, format 2, format 3, format 4 and new format, and an LBT priority level order of the LBT mechanism corresponding to different PRACH formats includes at least one of the following: format 0>format 1>format 2>format 3>format 4>new format; format 0>format 1>format 2 and/or format 3>format 4>new format; format 0>format 4>format 1>format 2>format 3>new format; format 4>format 0>format 1>format 2>format 3>new format; format 4>new format>format 0>format 1>format2>format3; format 0>format 4>format 1>format 2 and/or format 3>new format; format 4>format 0>format 1>format 2 and/or format 3>new format; and format 4>new format>format 0>format 1>format 2 and/or format 3.

An embodiment of the present disclosure provides a random access device. The device includes: a first determining module, which is configured to determine listen-before-talk (LBT) priority levels for performing an LBT mechanism corresponding to messages transmitted during a random access process, and/or LBT priority levels of an LBT mechanism corresponding to different physical random access channel (PRACH) formats; and a first transmission module, which is configured to transmit the messages for random access by means of the determined LBT priority levels corresponding to the messages and/or LBT priority levels corresponding to different PRACH formats after the LBT mechanism is successfully performed.

Preferably, an LBT priority level order corresponding to the messages transmitted during the random access process includes one of the following: Msg0>Msg1>Msg2; Msg0>Msg2>Msg1; Msg1>Msg0>Msg2; Msg1>Msg2>Msg0; Msg2>Msg1>Msg0; Msg2>Msg0>Msg1; Msg1>Msg2>Msg3>Msg4; Msg1>Msg2>Msg4>Msg3; Msg1>Msg3>Msg2>Msg4; Msg1>Msg3>Msg4>Msg2; Msg1>Msg4>Msg2>Msg3; Msg1>Msg4>Msg3>Msg2; Msg2>Msg1>Msg3>Msg4; Msg2>Msg1>Msg4>Msg3; Msg2>Msg3>Msg1>Msg4; Msg2>Msg3>Msg4>Msg1; Msg2>Msg4>Msg1>Msg3; Msg2>Msg4>Msg3>Msg1; Msg3>Msg1>Msg2>Msg4; Msg3>Msg1>Msg4>Msg2; Msg3>Msg2>Msg1>Msg4; Msg3>Msg2>Msg4>Msg1; Msg3>Msg4>Msg1>Msg2; Msg3>Msg4>Msg2>Msg1; Msg4>Msg1>Msg2>Msg3; Msg4>Msg1>Msg3>Msg2; Msg4>Msg2>Msg1>Msg3; Msg4>Msg2>Msg3>Msg1; Msg4>Msg3>Msg2>Msg1; and Msg4>Msg3>Msg1>Msg2; where Mgs0 is used for a base station to indicate a preamble transmitted by a user equipment (UE) and/or for transmitting a PRACH time-frequency domain resource message of the preamble, Mgs1 is used for the UE to transmit a preamble message to the base station, Mgs2 is used for the base station to transmit a response message to the UE, Mgs3 is used for the UE to transmit a request message to the base station, and Mgs4 is used for the base station to transmit a contention resolution result message to the UE.

Preferably, a preamble set to which the preamble transmitted in the Msg1 message belongs includes: a third preamble set for contention based random access and a fourth preamble set for non-contention based random access, where the third preamble set and the fourth preamble set form a second preamble set.

Preferably, in a case that the number of elements in the second preamble set is unchanged, the number of elements in the fourth preamble set is increased or decreased by decreasing or increasing the number of elements in the third preamble set; or on a premise that the number of elements in the second preamble set is extended to obtain a first preamble set, the number of elements in the fourth preamble set is increased while the number of elements in the third preamble is kept unchanged by adding a number of newly added preambles in the second preamble set to the fourth preamble set; and on a premise that the number of elements in the second preamble set is extended to obtain the first preamble set, the number of elements in the third preamble set and/or the number of elements in the fourth preamble set are configured via signaling according to an application scenarios; where the signaling includes high-layer RRC signaling or physical layer DCI signaling.

Preferably, the device further includes a second determining module, which is configured to determine time domain resources or candidate PRACH time domain resources for transmitting an Mgs1 by using at least one of the following parameters: a PRACH time domain position pattern, a period or a period set in which the PRACH time domain resources occur, an offset of the PRACH time domain position in the period, a PRACH time window start position, a period in which the PRACH time window appears, a PRACH time window length, a time domain resource start position in the PRACH time window, a domain resource interval in the PRACH time window, a time domain resource end position in the PRACH time window, and the number of time domain resources in the PRACH time window.

Preferably, the second determining module is further configured to determine time domain resources or candidate PRACH time domain resources for transmitting the Mgs1 or the parameters for determining the time domain resources in at least one of the following manners: high-layer radio resource control (RRC) signaling configuration, a physical layer downlink control information (DCI) signaling notification, a combination of the high-layer RRC signaling configuration and the physical layer DCI signaling notification, and a predetermined implication.

Preferably, the physical layer DCI signaling notification includes: configuring PRACH time domain resources or candidate PRACH time domain resources or the parameters for determining the time domain resources via first physical layer DCI signaling, and triggering enabling of the configured PRACH time domain resources or candidate PRACH time domain resources or the parameters for determining the time domain resources via second DCI signaling.

Preferably, the combination of the high-layer RRC signaling configuration and the physical layer DCI signaling notification includes: configuring PRACH time domain resources or candidate PRACH time domain resources or the parameters for determining the time domain resources via the high-layer RRC signaling, and triggering enabling of the configured PRACH time domain resources or candidate PRACH time domain resources or the parameters for determining the time domain resources via the DCI signaling.

Preferably, the predetermined implication includes: triggering enabling of the configured PRACH time domain resources or candidate PRACH time domain resources or the parameters for determining the time domain resources at least one of the following positions: a downlink transmission burst end position, a position determined by a subframe n transmitted by a physical downlink control channel (PDCCH) order and a predetermined timing relationship between n and a triggering position, an predetermined uplink subframe position, a predetermined uplink subframe position after the downlink transmission burst, a specific uplink subframe in an uplink transmission burst, an uplink transmission burst, and a subframe position corresponding to the successful performing of the listen-before-talk (LBT) mechanism on the uplink.

Preferably, the predetermined timing relationship includes: n+k, where n is a subframe position of the subframe transmitted by the physical downlink control channel (PDCCH) order, and k is a positive integer greater than or equal to 1 or k is a positive integer greater than or equal to 4.

Preferably, the second determining module includes: a first determining unit, which is configured to determine the k by at least one of the following manners: a physical layer DCI signaling notification, a high-layer RRC signaling notification, and a pre-agreement by the base station and the UE.

Preferably, the predetermined uplink subframe position includes at least one of the following: a first uplink subframe, a second uplink subframe, a first uplink subframe in the uplink transmission burst, a second uplink subframe in the uplink transmission burst, an uplink subframe whose subframe index is an even number in the uplink transmission burst, an uplink subframe whose subframe index is an odd number in the uplink transmission burst, and an uplink subframe pre-agreed by the base station and the UE.

Optionally, the device further includes: a third determining module, which is configured to determine frequency domain resources for transmitting the Mgs1 by at least one of the following manners: a high-layer radio resource control (RRC) signaling configuration, a physical layer downlink control information (DCI) signaling notification, and a combination of the high-layer RRC signaling configuration and the physical layer DCI signaling notification.

Preferably, a parameter for determining the frequency domain resources includes at least one of the following: a position index of a frequency domain start physical resource block (PRB) or a resource element (RE), a position index set of the frequency domain start physical resource block (PRB) or the resource element (RE), a frequency domain interval, frequency domain repetition times z, a frequency domain repetition times set, and the number of PRBs included in frequency domain repetitions and/or the number of REs included in frequency domain repetitions.

Preferably, the device further includes: an execution module, which is configured to perform the listen-before-talk (LBT) mechanism before transmitting the Mgs1; and a second transmission module, which is configured to transmit a first indication message to the base station when the LBT mechanism is successfully performed, where the first indication message is used for indicating that the UE performs the LBT mechanism successfully or unsuccessfully; or transmit a second indication message to the base station when the LBT mechanism is unsuccessfully performed, where the second indication message is used for instructing an MAC layer not to perform a counter accumulation operation on a PreambleTransMax.

Preferably, the device further includes: an extending module, which is configured to extend a predetermined time window for the UE to receive an Mgs2 to obtain an extended time window; and a first receiving module, which is configured to receive the Mgs2 in the extended time window.

Preferably, the extending module is further configured to extend the predetermined time window for the UE to receive the Mgs2 to obtain the extended time window by at least one of the following manners: (i) extending the predetermined time window for the UE to receive the Mgs2 by dynamically indicating a time starting point at which the UE receives the Mgs2 to obtain an extended time window of subframes n+k to n+k+L+RA-ResponseWindowSize, where n is a subframe number of a subframe for the UE to transmit the Mgs1, n+k is the time starting point at which the UE receives the Mgs2, L is a predetermined time length, and RA-ResponseWindowSize is a length of the predetermined time window; (ii) extending the predetermined time window for the UE to receive the Mgs2 to obtain the extended time window by increasing the length of the predetermined time window; (iii) extending the predetermined time window for the UE to receive the Mgs2 to obtain the extended time window by adding an additional time window for receiving the Mgs2; and (iv) extending the predetermined time window for the UE to receive the Mgs2 to obtain the extended time window by increasing an additional number of times to receive the Mgs2.

Preferably, L, k and RA-ResponseWindowSize are obtained by at least one of the following manners: high-layer radio resource control (RRC) signaling, physical layer downlink control information (DCI) signaling, and a pre-agreement by the base station and the UE.

Preferably, the device further includes: a third transmission module, which is configured to transmit a third indication message to a media access control (MAC) layer when the UE fails to receive the Mgs2, where the third indication message is used for instructing the UE not to raise a power for transmitting the preamble or instructing the MAC layer not to perform a counter accumulation operation on the PreambleTransMax.

Preferably, the device further includes: a second receiving module, which is configured to receive the Mgs2 from the base station after the Mgs1 is transmitted to the base station, where the Mgs2 carries a time advance (TA), an uplink grant (UL grant), a preamble index, and a temporary cell radio network temporary identifier (TC-RNTI).

Preferably, the Mgs2 further carries at least one of the following: a time domain subframe position for transmitting an Msg3 message, a time domain subframe position set for transmitting the Msg3 message, a time window for transmitting the Msg3 message, time domain resources and offset for transmitting the Msg3 message at a start of the time window for transmitting the Msg3 message, a time domain resource interval for transmitting the Msg3 message in the time window for transmitting the Msg3 message, the number of times for transmitting the Msg3 message, the number of time domain resources for transmitting an Msg3, and a predetermined timing relationship value between time domain resources for the UE to receive the Mgs2 transmitted by the base station and time domain resources for the UE to transmit the Msg3 message.

Preferably, the predetermined timing relationship value between time domain resources for the UE to receive the Mgs2 transmitted by the base station and time domain resources for the UE to transmit the Msg3 message includes: n+k2, wherein k2 is a value greater than or equal to 1, or k2 is a value greater than or equal to 4.

Preferably, the PRACH format includes: format 0, format 1, format 2, format 3, format 4 and new format, and an LBT priority level order of the LBT mechanism corresponding to different PRACH formats includes at least one of the following: format 0>format 1>format 2>format 3>format 4>new format; format 0>format 1>format 2 and/or format 3>format 4>new format; format 0>format 4>format 1>format 2>format 3>new format; format 4>format 0>format 1>format 2>format 3>new format; format 4>new format>format 0>format 1>format2>format3; format 0>format 4>format 1>format 2 and/or format 3>new format; format 4>format 0>format 1>format 2 and/or format 3>new format; and format 4>new format>format 0>format 1>format 2 and/or format 3.

An Embodiment of the present invention provides a user equipment (UE) which includes any one of the device described above.

Optionally, a storage medium is further configured to store program codes for executing the following steps: listen-before-talk (LBT) priority levels for performing an LBT mechanism corresponding to messages transmitted during a random access process, and/or LBT priority levels of an LBT mechanism corresponding to different physical random access channel (PRACH) formats are determined; and the messages for random access are transmitted by means of the determined LBT priority levels corresponding to the messages and/or LBT priority levels corresponding to different PRACH formats after successfully performing the LBT mechanism.

Optionally, a storage medium is further configured to store program codes for performing the following step: an LBT priority level order corresponding to the messages transmitted during the random access process includes one of the following: Msg0>Msg1>Msg2; Msg0>Msg2>Msg1; Msg1>Msg0>Msg2; Msg1>Msg2>Msg0; Msg2>Msg1>Msg0; Msg2>Msg0>Msg1; Msg1>Msg2>Msg3>Msg4; Msg1>Msg2>Msg4>Msg3; Msg1>Msg3>Msg2>Msg4; Msg1>Msg3>Msg4>Msg2; Msg1>Msg4>Msg2>Msg3; Msg1>Msg4>Msg3>Msg2; Msg2>Msg1>Msg3>Msg4; Msg2>Msg1>Msg4>Msg3; Msg2>Msg3>Msg1>Msg4; Msg2>Msg3>Msg4>Msg1; Msg2>Msg4>Msg1>Msg3; Msg2>Msg4>Msg3>Msg1; Msg3>Msg1>Msg2>Msg4; Msg3>Msg1>Msg4>Msg2; Msg3>Msg2>Msg1>Msg4; Msg3>Msg2>Msg4>Msg1; Msg3>Msg4>Msg1>Msg2; Msg3>Msg4>Msg2>Msg1; Msg4>Msg1>Msg2>Msg3; Msg4>Msg1>Msg3>Msg2; Msg4>Msg2>Msg1>Msg3; Msg4>Msg2>Msg3>Msg1; Msg4>Msg3>Msg2>Msg1; and Msg4>Msg3>Msg1>Msg2; where Mgs0 is used for a base station to indicate a preamble transmitted for a user equipment (UE) and/or to transmit a PRACH time-frequency domain resource message of the preamble, Mgs1 is used for the UE to transmit a preamble message to the base station, Mgs2 is used for the base station to transmit a response message to the UE, Mgs3 is used for the UE to transmit a request message to the base station, and Mgs4 is used for the base station to transmit a contention resolution result message to the UE.

Optionally, a storage medium is further configured to store program codes for performing the following step: a preamble set to which the preamble transmitted in the Msg1 message belongs includes: a third preamble set for contention based random access and a fourth preamble set for non-contention based random access, where the third preamble set and the fourth preamble set form a second preamble set.

Optionally, a storage medium is further configured to store program codes for performing the following steps: in a case that the number of elements in the second preamble set is unchanged, the number of elements in the fourth preamble set is increased or decreased by decreasing or increasing the number of elements in the third preamble set; or on a premise that the number of elements in the second preamble set is extended to obtain a first preamble set, the number of elements in the fourth preamble set is increased while the number of elements in the third preamble is kept unchanged by adding a number of newly added preambles in the second preamble set to the fourth preamble set; and on a premise that the number of elements in the second preamble set is extended to obtain the first preamble set, the number of elements in the third preamble set and/or the number of elements in the fourth preamble set is configured via signaling according to an application scenarios; where the signaling includes high-layer RRC signaling or physical layer DCI signaling.

Optionally, a storage medium is further configured to store program codes for performing the following step: time domain resources or candidate PRACH time domain resources for transmitting the Mgs1 are determined by using at least one of the following parameters: a PRACH time domain position pattern, a period or a period set in which the PRACH time domain resources appear, an offset of the PRACH time domain position in the period, a PRACH time window start position, a period in which the PRACH time window appears, a PRACH time window length, a time domain resource start position in the PRACH time window, a domain resource interval in the PRACH time window, a time domain resource end position in the PRACH time window, and the number of time domain resources in the PRACH time window.

Optionally, a storage medium is further configured to store program codes for performing the following step: time domain resources or candidate PRACH time domain resources for transmitting the Mgs1 or the parameters for determining the time domain resources are determined in at least one of the following manners: high-layer radio resource control (RRC) signaling configuration, a physical layer downlink control information (DCI) signaling notification, a combination of the high-layer RRC signaling configuration and the physical layer DCI signaling notification, and a predetermined implication.

Optionally, a storage medium is further configured to store program codes for performing the following step: the physical layer DCI signaling notification includes: configuring PRACH time domain resources or candidate PRACH time domain resources or the parameters for determining the time domain resources via first physical layer DCI signaling, and triggering enabling of the configured PRACH time domain resources or candidate PRACH time domain resources or the parameters for determining the time domain resources via second DCI signaling.

Optionally, a storage medium is further configured to store program codes for performing the following step: the manner of using the combination of the high-layer RRC signaling configuration and the physical layer DCI signaling notification includes: configuring PRACH time domain resources or candidate PRACH time domain resources or the parameters for determining the time domain resources via the high-layer RRC signaling, and triggering enabling of the configured PRACH time domain resources or candidate PRACH time domain resources or the parameters for determining the time domain resources via the DCI signaling.

Optionally, a storage medium is further configured to store program codes for performing the following step: the manner of using the predetermined implication includes: triggering the configured PRACH time domain resources or candidate PRACH time domain resources or the parameters for determining the time domain resources at least one of the following positions: a downlink transmission burst end position, a position determined by a subframe n transmitted by a physical downlink control channel (PDCCH) order and a predetermined timing relationship between the subframe n and a triggering position, an uplink predetermined subframe position, an uplink predetermined subframe position after the downlink transmission burst, an uplink specific subframe in an uplink transmission burst, an uplink transmission burst, and a subframe position corresponding to the successful execution of the listen-before-talk (LBT) mechanism on the uplink.

Optionally, a storage medium is further configured to store program codes for performing the following step: the predetermined timing relationship includes n+k, where n is a subframe position of the subframe transmitted by the physical downlink control channel (PDCCH) order, and k is a position integer greater than or equal to 1 or k is a positive integer greater than or equal to 4.

Optionally, a storage medium is further configured to store program codes for performing the following step: the k is determined in at least one of the following manners: a physical layer DCI signaling notification, a high-layer RRC signaling notification, and a manner pre-agreed by the base station and the UE.

Optionally, a storage medium is further configured to store program codes for performing the following step: the uplink predetermined subframe position includes at least one of the following: a first uplink subframe, a second uplink subframe, a first uplink subframe in the uplink transmission burst, a second uplink subframe in the uplink transmission burst, an uplink subframe whose subframe index is an even number in the uplink transmission burst, an uplink subframe whose subframe index is an odd number in the uplink transmission burst, and an uplink subframe pre-agreed by the base station and the UE.

Optionally, a storage medium is further configured to store program codes for performing the following step: frequency domain resources for transmitting the Mgs1 are determined in at least one of the following manners: high-layer radio resource control (RRC) signaling configuration, a physical layer downlink control information (DCI) signaling notification, and a combination of the high-layer RRC signaling configuration and the physical layer DCI signaling notification.

Optionally, a storage medium is further configured to store program codes for performing the following step: a parameter for determining the frequency domain resources includes at least one of the following: a position index of a frequency domain start physical resource block (PRB) or a resource element (RE), a position index set of the frequency domain start physical resource block (PRB) or the resource element (RE), a frequency domain interval, frequency domain repetition times z, frequency domain repetition times set, and the number of the PRB in frequency domain repetitions and/or the number of the RE included in frequency domain repetitions.

Optionally, a storage medium is further configured to store program codes for performing the following steps: the listen-before-talk (LBT) mechanism is performed before transmitting the Mgs1; and a first indication message is transmitted to the base station when the LBT mechanism is successfully performed, where the first indication message is used for indicating that the UE executes the LBT mechanism successfully or unsuccessfully; or a second indication message is transmitted to the base station when the LBT mechanism is unsuccessfully performed, where the second indication message is used for instructing an MAC layer not to perform a PreambleTransMax counter accumulation operation.

Optionally, a storage medium is further configured to store program codes for performing the following steps: a predetermined time window for the UE to receive the Mgs2 is extended to obtain an extended time window; and the Mgs2 is received in the extended time window.

Optionally, a storage medium is further configured to store program codes for performing the following step: the predetermined time window for the UE to receive the Mgs2 is extended to obtain an extended time window in at least one of the following manners: extending the predetermined time window for the UE to receive the Mgs2 by dynamically indicating a time start point at which the UE receives the Mgs2 to obtain an extended time window of an n+k subframe to n+k+L+RA-ResponseWindowSize, where n is a subframe for the UE to transmit the Mgs1, n+k is the time start point at which the UE receives the Mgs2, L is a predetermined time length, and RA-ResponseWindowSize is a length of the predetermined time window; extending the predetermined time window for the UE to receive the Mgs2 to obtain the extended time window by increasing the length of the predetermined time window; extending the predetermined time window for the UE to receive the Mgs2 to obtain the extended time window by increasing additional time windows for receiving the Mgs2; and extending the predetermined time window for the UE to receive the Mgs2 to obtain the extended time window by increasing an additional number of times to receive the Mgs2.

Optionally, a storage medium is further configured to store program codes for performing the following step: L, k and RA-ResponseWindowSize are obtained in at least one of the following manners: high-layer radio resource control (RRC) signaling, physical layer downlink control information (DCI) signaling, and a manner pre-agreed by the base station and the UE.

Optionally, a storage medium is further configured to store program codes for performing the following step: a third indication message is transmitted to a media access control (MAC) layer when the UE does not receive the Mgs2, where the third indication message is used for instructing the UE not to raise a power for transmitting the preamble or instructing the MAC layer not to perform the PreambleTransMax counter accumulation operation.

Optionally, a storage medium is further configured to store program codes for performing the following step: the Mgs2 is received from the base station after the Mgs1 is transmitted to the base station, where the Mgs2 carries a time advance (TA), an uplink grant (UL grant), a preamble index, and a temporary cell radio network temporary identifier (TC-RNTI).

Optionally, a storage medium is further configured to store program codes for performing the following step: the Mgs2 further carries at least one of the following: a time domain subframe position for transmitting an Msg3 message, a time domain subframe position set for transmitting the Msg3 message, a time window for transmitting the Msg3 message, time domain resources and offset for transmitting the Msg3 message at a start of the time window for transmitting the Msg3 message, a time domain resource interval for transmitting the Msg3 message in the time window for transmitting the Msg3 message, the number of times for transmitting the Msg3 message, the number of time domain resources for transmitting an Msg3, and a predetermined timing relationship value between time domain resources for the UE to receive the Mgs2 transmitted by the base station and time domain resources for the UE to transmit the Msg3 message.

Optionally, a storage medium is further configured to store program codes for performing the following step: the predetermined timing relationship value between time domain resources for the UE to receive the Mgs2 transmitted by the base station and time domain resources for the UE to transmit the Msg3 message includes: n+k2, where k2 is a value greater than or equal to 1, or k2 is a value greater than or equal to 4.

Optionally, a storage medium is further configured to store program codes for performing the following steps: the PRACH format includes: format 0, format 1, format 2, format 3, format 4 and new format, and an LBT priority level order of the LBT mechanism corresponding to different PRACH formats includes at least one of the following: format 0>format 1>format 2>format 3>format 4>new format; format 0>format 1>format 2 and/or format 3>format 4>new format; format 0>format 4>format 1>format 2>format 3>new format; format 4>format 0>format 1>format 2>format 3>new format; format 4>new format>format 0>format 1>format2>format3; format 0>format 4>format 1>format 2 and/or format 3>new format; format 4>format 0>format 1>format 2 and/or format 3>new format; and format 4>new format>format 0>format 1>format 2 and/or format 3.

In the embodiments of the present disclosure, the LBT mechanism is performed for the random access according to the correspondence between different messages and/or the PRACH formats and the LBT priority levels. In such a way, the problem of the need of optimizing random access for a user equipment in the related art is resolved, thereby optimizing random access and improving the random access success rate.

BRIEF DESCRIPTION OF DRAWINGS

The drawings described herein are used to provide a further understanding of the present invention, and form a part of the present application. The exemplary embodiments and descriptions thereof in the present invention are used to explain the present invention and do not limit the present invention in any improper way. The drawings are as follows.

DETAILED DESCRIPTION

The present invention will be described in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present invention are used to distinguish between similar objects and are not necessarily used to describe a particular order or sequence.

Method Embodiment

Figure 1:
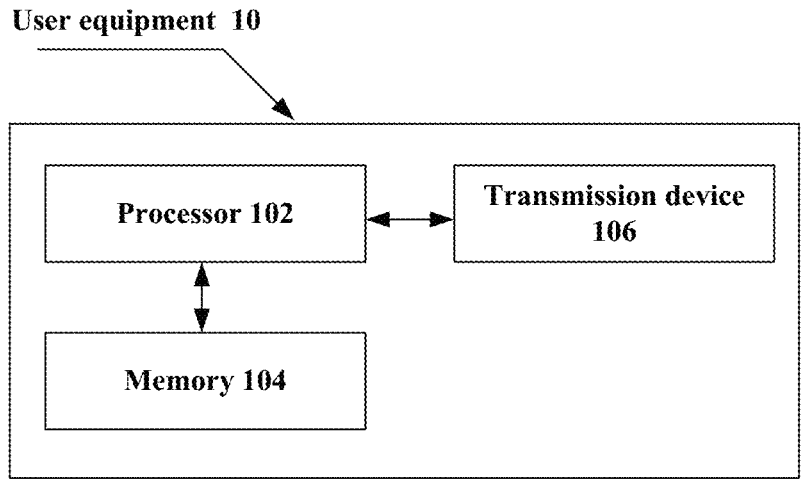
FIG. 1 is a block diagram of a hardware structure of a user equipment of the random access method according to an embodiment of the present disclosure.

A method embodiment provided by the embodiment I of the present application may be executed in a user equipment, a computer terminal or other similar computing devices. Taking the method to be executed in the user equipment as an example, FIG. 1 is a block diagram illustrating a hardware structure of a user equipment of a random access method according to an embodiment of the present disclosure. As shown in FIG. 1, a user equipment 10 may include one or more (only one is shown in FIG. 1) processors 102 (the processor 102 may include, but is not limited to, a microprocessor such as an MCU, a programmable logic device such as an FPGA or other processing devices), a memory 104 used for storing data, and a transmission device 106 used for implementing a communication function. It will be understood by those skilled in the art that the structure shown in FIG. 1 is merely illustrative, and not intended to limit the structure of the electronic device described above. For example, the user equipment 10 may further include more or less components than the components shown in FIG. 1, or has a configuration different from the configuration shown in FIG. 1.

The memory 104 may be used for storing software programs and modules of application software, such as program instructions/modules corresponding to the random access method in the embodiments of the present disclosure. The processor 102 executes the software programs and modules stored in the memory 104 so as to perform various function applications and data processing, that is, to implement the method described above. The memory 104 may include a high-speed random access memory, and may further include a nonvolatile memory, such as one or more magnetic storage devices, flash memories or other nonvolatile solid-state memories. In some examples, the memory 104 may further include memories that are remotely disposed with respect to the processors 102. These remote memories may be connected to the user equipment 10 via a network. Examples of such a network include, but are not limited to, the Internet, intranets, local area networks, mobile communication networks, and combinations thereof.

The transmission device 106 is used for receiving or transmitting data via one network. Specific examples of such a network may include a wireless network provided by a communication provider of the user equipment 10. In one example, the transmission device 106 includes a network interface controller (NIC), which may be connected to other network devices via a base station, thereby communicating with the Internet. In one example, the transmission device 106 may be a radio frequency (RF) module, which is configured to communicate with the Internet in a wireless way.

Figure 2:
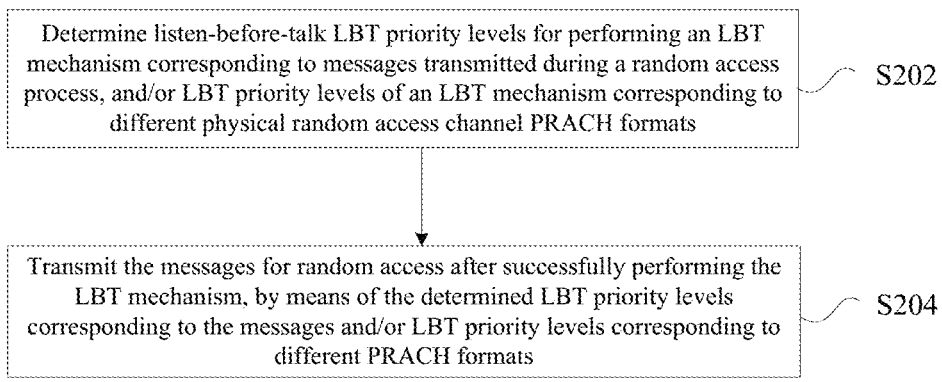
FIG. 2 is a flowchart of a random access method according to an embodiment of the present disclosure.

The present embodiment provides a random access method applied to the user equipment. FIG. 2 is a flowchart of a random access method according to an embodiment of the present disclosure. As shown in FIG. 2, the method includes steps S202 and S204 described below.

In step S202, listen-before-talk (LBT) priority levels for performing LBT mechanisms corresponding to messages transmitted during a random access process, and/or LBT priority levels of LBT mechanisms corresponding to different physical random access channel (PRACH) formats are determined.

In step S204, the messages for random access are transmitted by means of the determined LBT priority levels corresponding to the messages and/or LBT priority levels corresponding to different PRACH formats after successfully performing the LBT mechanisms.

Through the steps described above, the LBT mechanism is performed for the random access according to the correspondence between different messages and/or the PRACH formats and the LBT priority levels. In such a way, the problem of the need of optimizing random access for a user equipment in the related art is resolved, thereby optimizing random access and improving the random access success rate.

Optionally, the above steps may, but are not limited to, be executed by a user equipment.

Preferably, the LBT priority level order corresponding to the messages transmitted during the random access process may include multiple types, for example may include one of the following: Msg0>Msg1>Msg2; Msg0>Msg2>Msg1; Msg1>Msg0>Msg2; Msg1>Msg2>Msg0; Msg2>Msg1>Msg0; Msg2>Msg0>Msg1; Msg1>Msg2>Msg3>Msg4; Msg1>Msg2>Msg4>Msg3; Msg1>Msg3>Msg2>Msg4; Msg1>Msg3>Msg4>Msg2; Msg1>Msg4>Msg2>Msg3; Msg1>Msg4>Msg3>Msg2; Msg2>Msg1>Msg3>Msg4; Msg2>Msg1>Msg4>Msg3; Msg2>Msg3>Msg1>Msg4; Msg2>Msg3>Msg4>Msg1; Msg2>Msg4>Msg1>Msg3; Msg2>Msg4>Msg3>Msg1; Msg3>Msg1>Msg2>Msg4; Msg3>Msg1>Msg4>Msg2; Msg3>Msg2>Msg1>Msg4; Msg3>Msg2>Msg4>Msg1; Msg3>Msg4>Msg1>Msg2; Msg3>Msg4>Msg2>Msg1; Msg4>Msg1>Msg2>Msg3; Msg4>Msg1>Msg3>Msg2; Msg4>Msg2>Msg1>Msg3; Msg4>Msg2>Msg3>Msg1; Msg4>Msg3>Msg2>Msg1; and Msg4>Msg3>Msg1>Msg2; where Mgs0 is used for a base station to indicate a preamble transmitted by a user equipment (UE) and/or to transmit a PRACH time-frequency domain resource message of the preamble, Mgs1 is used for the UE to transmit a preamble message to the base station, Mgs2 is used for the base station to transmit a response message to the UE, Mgs3 is used for the UE to transmit a request message to the base station, and Mgs4 is used for the base station to transmit a contention resolution result message to the UE.

Preferably, a preamble set to which the preamble transmitted in the Msg1 message belongs includes: a third preamble set for contention based random access and a fourth preamble set for non-contention based random access, where the third preamble set and the fourth preamble set form a second preamble set.

Preferably, in a case that the number of elements in the second preamble set is unchanged, the number of elements in the fourth preamble set is increased or decreased by decreasing or increasing the number of elements in the third preamble set; or on a premise that the number of elements in the second preamble set is extended to obtain a first preamble set, the number of elements in the fourth preamble set is increased while the number of elements in the third preamble is kept unchanged by adding the number of newly added preambles in the second preamble set into the fourth preamble set; and on a premise that the number of elements in the second preamble set is extended to obtain the first preamble set, the number of elements in the third preamble set and/or the number of elements in the fourth preamble set are configured via signaling according to an application scenarios; where the signaling includes high-layer RRC signaling or physical layer DCI signaling.

For example, in a case that each of the existing cells has 64 available preambles, the method for increasing the number of preambles for the non-contention based random access may include: (i) when 64 available preambles in each of the existing cells is unchanged, decreasing the number of preambles for the contention based random access and increasing the number of the preambles for the non-contention based random access manner; (ii) adding new preambles to obtain a total number of N available preambles in each of the existing cells and applying the newly added preambles in the N available preambles in the cell to the non-contention based random access manner, where the number of the newly added preambles is N−64; and (iii) adding new preambles to obtain a total number of N available preambles in each of the existing cells, and reallocating the N available preambles by configuring preambles for the contention based random access and preambles for the non-contention based random access respectively, according to configuration signaling. It is to be noted that in a case of increasing the total number of preambles in the cell, LAA number of RA-Preambles are configured according to the high-layer RRC signaling, where the number of preambles for the non-contention based random access in the LAA is equal to the difference between N and LAA number of RA-Preambles. The number of deleted preambles and/or the total number of available preambles in the cell may be obtained in various manners, for example, may be obtained in at least one of the following manners: high-layer RRC signaling, UE dedicated DCI signaling, common DCI signaling, Group DCI signaling, DL DCI signaling, a predefinition, and a previous agreement of the base station and the UE.

Before transmitting the Mgs1, resources for transmitting the Mgs1 need to be determined, where the resources include time domain resources and/or frequency domain resources, which will be respectively described below.

The time domain resources or candidate PRACH time domain resources for transmitting the Mgs1 may be determined by using at least one of the following parameters: a PRACH time domain position pattern, a period or a period set in which the PRACH time domain resources appear, an offset of the PRACH time domain position in the period, a PRACH time window start position, a period in which a PRACH time window appears, a PRACH time window length, a time domain resource start position in the PRACH time window, a time domain resource interval in the PRACH time window, a time domain resource end position in the PRACH time window, and the number of time domain resources in the PRACH time window.

The time domain resources or candidate PRACH time domain resources for transmitting the Mgs1 or the parameters for determining the time domain resources may be determined by various manners, for example, by at least one of the following manners: a high-layer radio resource control (RRC) signaling configuration, a physical layer downlink control information (DCI) signaling notification (the DCI signaling may include: UE dedicated DCI signaling, common DCI signaling, Group DCI signaling and DL DCI signaling), a combination of the high-layer RRC signaling configuration and the physical layer DCI signaling notification, and a predetermined implication. The above manners are respectively illustrated below.

The manner of the high-layer radio resource control RRC signaling configuration may be implemented by using the following examples: configuring a PRACH time domain position pattern via high-layer RRC signaling; configuring a period or a period set in which PRACH time domain resources appear and/or an offset of the PRACH time domain position in the period via the high-layer RRC signaling; indicating an index identifier corresponding to a PRACH time domain resource position or a set by the high-layer RRC signaling; and configuring at least one of following via the high-layer RRC signaling: a time window length for transmitting the PRACH, a PRACH time domain start position in the time window, and an interval.

The manner of physical layer downlink control information (DCI) signaling notification may be implemented by notifying the following: a PRACH time domain resource position index, a PRACH time domain resource position index set, a PRACH time window length, a PRACH time domain resource start position index in the time window, a PRACH time domain resource interval in the time window, and the number of PRACH time domain resources in the time window.

Preferably, the manner of the physical layer DCI signaling notification includes: configuring PRACH time domain resources or candidate PRACH time domain resources or the parameters for determining the time domain resources via first physical layer DCI signaling, and triggering enabling of the configured PRACH time domain resources or candidate PRACH time domain resources or the parameters for determining the time domain resources via second DCI signaling.

Preferably, the manner of the combination of the high-layer RRC signaling configuration and the physical layer DCI signaling notification includes: configuring PRACH time domain resources or candidate PRACH time domain resources or the parameters for determining the time domain resources via the high-layer RRC signaling, and triggering enabling of the configured PRACH time domain resources or candidate PRACH time domain resources or the parameters for determining the time domain resources via the DCI signaling.

Preferably, the manner of the predetermined implication includes: triggering enabling of the configured PRACH time domain resources or candidate PRACH time domain resources or the parameters for determining the time domain resources at least one of the following positions: a downlink transmission burst end position; a position determined according to a subframe n transmitted by a physical downlink control channel (PDCCH) order and a predetermined timing relationship between the subframe n and a triggering position; a predetermined uplink subframe position; a predetermined uplink subframe position after the downlink transmission burst; a specific uplink subframe in an uplink transmission burst; an uplink transmission burst, and a subframe position corresponding to the successful performing of the listen-before-talk (LBT) mechanism on the uplink.

The predetermined timing relationship includes: n+k, where n is a subframe position of the subframe transmitted by the physical downlink control channel (PDCCH) order, and k is a positive integer greater than or equal to 1 or k is a positive integer greater than or equal to 4.

Preferably, the k is determined in at least one of the following manners: a manner of a physical layer DCI signaling notification, a high-layer RRC signaling notification, and a manner of a pre-agreement by the base station and the UE.

Preferably, the predetermined uplink subframe position includes at least one of the following: a first uplink subframe, a second uplink subframe, a first uplink subframe in the uplink transmission burst, a second uplink subframe in the uplink transmission burst, an uplink subframe whose subframe index is an even number in the uplink transmission burst, an uplink subframe whose subframe index is an odd number in the uplink transmission burst, and an uplink subframe pre-agreed by the base station and the UE.

Preferably, frequency domain resources for transmitting the Mgs1 are determined by at least one of the following manners: a high-layer radio resource control (RRC) signaling configuration, a physical layer downlink control information (DCI) signaling notification, and a combination of the high-layer RRC signaling configuration and the physical layer DCI signaling notification.

Preferably, a parameter for determining the frequency domain resources includes at least one of the following: a position index of a frequency domain start physical resource block (PRB) or resource element (RE), a position index set of the frequency domain start physical resource block (PRB) or resource element (RE), a frequency domain interval, frequency domain repetition times z, frequency domain repetition times set, and the number of PRBs included in frequency domain repetitions and/or the number of REs included in frequency domain repetitions.

In the existing art, when the UE fails to detect an RAR response transmitted by the base station in an RAR receiving time window, it is considered that the random access fails. At this moment, the UE needs to perform the Power ramping. For the LAA, the reason why the UE fail to receive the RAR response transmitted by the base station is possibly the LBT failure at the base station side. In view of this, in the LAA, an indication method for instructing the UE not to perform the Power ramping needs to be considered.

In view of this, in this preferred implementation, the listen-before-talk (LBT) mechanism is performed before transmitting the Mgs1; and a first indication message is transmitted to the base station when the LBT mechanism is successfully performed, where the first indication message is used for indicating that the UE performs the LBT mechanism successfully or unsuccessfully; or a second indication message is transmitted to the base station when the LBT mechanism is unsuccessfully performed, where the second indication message is used for instructing an MAC layer not to perform counter accumulation operation on a PreambleTransMax. It is to be noted that the first indication message and the second indication message may be transmitted on a licensed carrier or on an unlicensed carrier.

After the UE successfully transmits the preamble, the UE may fails to receive the RAR response transmitted by the base station to the UE in the RAR (i.e., Mgs2) receiving time window specified in the existing art due to the LBT failure at the base station side. Therefore, it is necessary to increase methods for the UE to receive the RAR response. Therefore, in this preferred implementation, a predetermined time window for the UE to receive the Mgs2 is extended to obtain an extended time window; and the Mgs2 is received in the extended time window. The predetermined time window may be extended in various manners. For example, the predetermined time window for the UE to receive the Mgs2 is extended to obtain the extended time window by at least one of the following manners: (i) extending the predetermined time window for the UE to receive the Mgs2 by dynamically indicating a time starting point at which the UE receives the Mgs2 to obtain an extended time window of subframes n+k to n+k+L+RA-ResponseWindowSize, that is, the UE transmits the preamble at the nth subframe and listens for the RAR response of the base station from the end of the nth subframe to n+L+RA-ResponseWindowSize, where n is a serial number of a subframe for the UE to transmit the Mgs1, n+k is the time starting point at which the UE receives the Mgs2, L is a predetermined time length, and RA-ResponseWindowSize is a length of the predetermined time window; (ii) extending the predetermined time window for the UE to receive the Mgs2 to obtain the extended time window by increasing the length of the predetermined time window; (iii) extending the predetermined time window for the UE to receive the Mgs2 to obtain the extended time window by adding an additional time window for receiving the Mgs2; and (iv) extending the predetermined time window for the UE to receive the Mgs2 to obtain the extended time window by increasing an additional number of times to receive the Mgs2.

Preferably, the parameter for extending the predetermined time window may be obtained in various manners. For example, L, k and RA-ResponseWindowSize are obtained by at least one of the following manners: high-layer radio resource control (RRC) signaling, physical layer downlink control information (DCI) signaling, and a pre-agreement by the base station and the UE.

Optionally, a third indication message is transmitted to a media access control (MAC) layer when the UE fails to receive the Mgs2, where the third indication message is used for instructing the UE not to raise a power for transmitting the preamble or instructing the MAC layer not to perform a counter accumulation operation on the PreambleTransMax. For example, in the RAR response time window, the UE transmits an indication message to the MAC when the base station performs the LBT unsuccessfully or when the random access fails due to the failure of performing the LBT by the UE. The indication message is used for instructing the UE not to raise the power PowerRampingStep in a next attempt to transmit the preamble, and/or, not to accumulate the times of preamble transmitting failure due to the LBT failure at the UE side into the PreambleTransMax.

Preferably, the Mgs2 is received from the base station after the Mgs1 is transmitted to the base station, where the Mgs2 carries a time advance (TA), an uplink grant (UL grant), a preamble index, and a temporary cell radio network temporary identifier (TC-RNTI).

If at least one of the Msg3 and Mgs4 is transmitted on the unlicensed carrier, the LBT result affects whether the at least one of the Mgs3 and Mgs4 can be transmitted on corresponding resources or not. Therefore, it is necessary to increase methods for transmitting the Msg3 and Msg4. In addition, a more optimized random access process may also be considered. It is to be noted that, the embodiments and preferred implementations escribed above are not limited to use in the LAA scenario, but are also applicable to the LAA dual connectivity (DC) or standalone scenario.

In order to improve the success rate of further receiving the Mgs3, the Mgs2 further carries at least one of the following: a position of a time domain subframe for transmitting an Msg3 message, a position set of time domain subframes for transmitting the Msg3 message, a time window for transmitting the Msg3 message, time domain resources and offset for transmitting the Msg3 message at a start of the time window for transmitting the Msg3 message, an interval of time domain resources for transmitting the Msg3 message in the time window for transmitting the Msg3 message, the number of times for transmitting the Msg3 message, the number of time domain resources for transmitting an Msg3, and a predetermined timing relation value between time domain resources for the UE to receive the Mgs2 transmitted by the base station and time domain resources for the UE to transmit the Msg3 message.

Preferably, the predetermined timing relation value between time domain resources for the UE to receive the Mgs2 transmitted by the base station and time domain resources for the UE to transmit the Msg3 message includes: n+k2, where k2 is a value greater than or equal to 1, or k2 is a value greater than or equal to 4. For example, k2 may be 1, 2, 3, 4, 5, 6 or 7.

Preferably, the PRACH format includes: format 0, format 1, format 2, format 3, format 4 and new format, and an LBT priority level order of the LBT mechanism corresponding to different PRACH formats includes at least one of the following: format 0>format 1>format 2>format 3>format 4>new format; format 0>format 1>format 2 and/or format 3>format 4>new format; format 0>format 4>format 1>format 2>format 3>new format; format 4>format 0>format 1>format 2>format 3>new format; format 4>new format>format 0>format 1>format2>format3; format 0>format 4>format 1>format 2 and/or format 3>new format; format 4>format 0>format 1>format 2 and/or format 3>new format; and format 4>new format>format 0>format 1>format 2 and/or format 3.

A specific description of the above embodiments is provided in preferred embodiments in conjunction with the above embodiments. The preferred embodiments are respectively described below.

Preferred Embodiment 1

This preferred embodiment provides a method of increasing preambles used in the non-contention based random access method.

The function of transmitting preambles during the random access process is to notify the base station (eNodeB) of a random access request and enable the base station (eNodeB) to estimate the transmission delay between the base station and the UE, so that the base station (eNodeB) calibrates the uplink timing and notifies the UE of the calibration information via the TA Command. The preambles are transmitted on the PRACH.

In the related LET technology, each of the cells has 64 available preamble sequences. The division of preamble sequences used in the contention based random access and preamble sequences used in the non-contention based random access among 64 available preamble sequences is as follows: preamble index #0~#51 used in the contention based random access scenario and preamble index #52~#63 used in the non-contention based random access scenario. The LET technology, preamble index #52~#59 are used in the handover scenario, and preamble index #60~#63 are used in the non-contention based random access, for example, downlink data arrival condition.

In view of this, if the LAA or LAA DC or Standalone only support the contention based random access manner, only four preambles with preamble index of #60~#63 are available for the non-contention based random access. When multiple UEs need to perform the random access, it is obvious that the number of preambles used in the non-contention based random access specified in the existing LBT technology can not satisfy the random access requirements of multiple UEs in the LAA. Therefore, it is necessary to consider a method of increasing preambles used in the non-contention based random access method.

The method of increasing preambles used in the non-contention based random access method provided by this preferred embodiment includes at least one of the following methods.

In method 1, the same preamble index is configured on a group of UEs.

For the method 1, the same preamble index is configured on the UE or the UE group in a same TAG. In a TAG group, when only one UE or a random UE successfully transmits the preamble, and/or receives the RAR response message transmitted by the base station, it is considered that the non-contention based random access fails.

Optionally, time domain and/or frequency domain PRACH resources for the UE to transmit the preamble in the TAG group may be same or different.

Optionally, the TAG group may be divided according to the distance between the base station and the base station, and/or re-divided according to the TA value reported by the UE in a period of time, and/or re-divided according to the TA value reported by the UE last time.

The base station described above may be a Macro base station, and/or a SCell micro base station, and/or a MeNB in the DC scenario, and/or a SeNB in the DC scenario, and/or a MeNB in the LAA DC/Standalone scenario, and/or a SeNB.

The number of preamble sequences used in the non-contention based random access in the method 1 is the same as that in the LTE technology.

In method 2, the number of preambles used in the non-contention based random access is extended.

For the method 2, on the premise that the existing 64 preambles is unchanged, the number of available preambles used in the contention based random access is divided dynamically, and/or the number of preambles used in the non-contention based random access in the handover scenario is divided dynamically, and/or the number of preambles used in the non-contention based random access in the downlink data arrival scenario is divided dynamically.

In the related LET technology, the number of preambles (number of RA-Preambles) used in the contention based random access is transmitted by the base station to the UE via the RACH-ConfigCommon (which is in the SIB-2 message). The number of preambles used in the non-contention based random access is determined via the number of RA-Preambles according to a specific relationship. The specific relationship is that the number of available preambles in the cell minus the number of RA-Preambles is equal to the number of preambles used in the non-contention based random access. The number of available preambles in the specified cell in the LTE is 64, the number of number of RA-Preambles is 52, and the number of preambles used in the non-contention based random access is 12.

For the LAA, the manner of configuring the number of the number of RA-Preambles and/or the number of preambles used in the non-contention based random access in the LAA includes at least one of the following manners described below.

In manner 1, the number of LAA number of RA-Preambles and/or the number of preambles used in the non-contention based random access in the LAA is configured via high-layer RRC signaling. The value range of the LAA number of RA-Preambles is [0, A]·A is greater than or equal to 0 and less than or equal to 52. Preferably, A may be 10, 20 or 30.

Optionally, the LAA number of RA-Preambles file may be added into the RACH-ConfigCommon in the RRC signaling, or the number of RA-Preambles in the LTE may be kept while its value range is modified.

In manner 2, the number of LAA number of RA-Preambles and/or the number of preambles used in the non-contention based random access is configured via physical layer DCI signaling.

Physical layer DCI signaling may include at least one of the following: UE dedicated DCI signaling, common DCI signaling, group DCI signaling, DL grant and newly-designed DCI signaling. The UE dedicated DCI signaling may be a DCI format IA. The common DCI signaling may be a DCI format 1C. The reserved bit may be used to indicate the number of LAA number of RA-Preambles and/or the number of preambles used in the non-contention based random access. Or the new random access trigger and/or parameter configuration branch is introduced into the DCI format 1C. Part or all of bits in the DCI format 1C may be used to indicated the number of LAA number of RA-Preambles and/or the number of preambles used in the non-contention based random access.

If the number of RA-Preambles and/or the LAA number of RA-Preambles and/or the number of preamble used in the non-contention based random access is not configured in the RACH-ConfigCommon of the high-layer RRC signaling, the UE determines the number of preambles used in the contention based random access and/or the number of preambles used in the non-contention based random access according to the physical layer DCI signaling.

If the number of RA-Preambles and/or the LAA number of RA-Preambles and/or the number of preamble used in the non-contention based random access is configured in the RACH-ConfigCommon of the high-layer RRC signaling, the UE, according to a specific rule, determines the LAA number of RA-Preambles and/or the number of preamble used in the non-contention based random access notified according to the physical layer DCI signaling or according to the high-layer RRC signaling as the number of preambles used in the non-contention based random access in the LAA system, LAA DC or Standalone.

The specific rule is as follows. If the number of RA-Preambles configured by the physical layer DCI is less than that configured by the RRC, the number of RA-Preambles configured by the physical layer DCI is adopted. If the number of RA-Preambles configured by the physical layer DCI is greater than that configured by the RRC, the number of RA-Preambles configured by the RRC is adopted. If the number of RA-Preambles configured by the physical layer DCI is equal to that configured by the RRC, either of them may be adopted. If the number of preambles for the non-contention based random access configured by the physical layer DCI is greater than that configured by the high-layer RRC or calculated according to the number of RA-Preambles and the total number of preambles, the number of preambles for the non-contention based random access configured by the physical layer DCI is adopted. If the number of preambles for the non-contention based random access configured by the physical layer DCI is less than that configured by the high-layer RRC or calculated according to the number of RA-Preambles and the total number of preambles, the number of preambles for the non-contention based random access configured by the high-layer RRC is adopted. If the number of preambles for the non-contention based random access configured by the physical layer DCI is equal to that configured by the high-layer RRC or calculated according to the number of RA-Preambles and the total number of preambles, either of them may be adopted.

Optionally, the number of available preambles for the non-contention based random access may be determined in the manner of a combination of high-layer RRC signaling and the physical layer DCI signaling. For example, the high-layer RRC signaling configures one or more preamble sequence numbers used in the non-contention based random access, and the physical layer DCI signaling triggers which preamble sequence set of the non-contention based random access is available, and/or, configures which preamble index in which preamble sequence set of the non-contention based random access for the UE. Alternatively, the high-layer RRC when configuring the number of RA-Preambles and/or the number or set of preambles for the non-contention based random access may be enabled or may not be enabled, and the physical layer DCI signaling triggers the enable and/or configures a dedicated preamble index for the UE or UE group.

In manner 3, the number of LAA number of RA-Preambles and/or the number of preambles used in the non-contention based random access is configured in a predefined manner.

The number of the number of RA-Preambles (the number of available preambles used in the contention based random access) or the number of preambles used in the non-contention based random access is predefined. The base station configures the dedicated preamble index for the UE or UE group on the basis of the predefined preamble sequence set used in the non-contention based random access.

For the LAA, the number of preambles used in the non-contention based random access in the handover scenario and/or the number of preambles used in the non-contention based random access in the downlink data arrival scenario may be notified to the UE via the high-layer RRC signaling (for example, the RACH-ConfigCommon), and/or physical layer DCI signaling (for example, the UE dedicated DCI signaling, common DCI signaling, group DCI signaling, DL grant and newly-designed DCI signaling), and/or the predefined manner.

Preferably, the number of preambles used in the non-contention based random access in the handover scenario and the number of preambles used in the non-contention based random access in the downlink data arrival scenario may be dynamically configured according to different requirements and scenarios.

Preferably, on the premise that the existing 64 preambles is unchanged, the number of preambles used in the non-contention based random access in the downlink data arrival scenario is extended by decreasing the number of available preambles used in the contention based random access manner or by decreasing the number of available preambles used in the non-contention based random access manner in the handover scenario.

In method 3, the number of available preambles in the cell is increased. The number of available preambles used in the non-contention based random access manner is extended in a manner of applying the newly increased preambles to the non-contention based random access manner. Preferably, the newly increased preambles may be used in the downlink data arrival event to trigger the random access condition. The total number of available preambles in the cell is extended in another manner of increasing preambles, where the total number is denoted as N. N preambles in the cell are re-allocated and respectively used in the contention based random access and the non-contention based random access.

The method 3 differs from the methods 1 and 2 described above in that the problem of insufficient number of available preambles used in the non-contention based random access is resolved by extending the number of available preambles in each cell.

Figure 3:
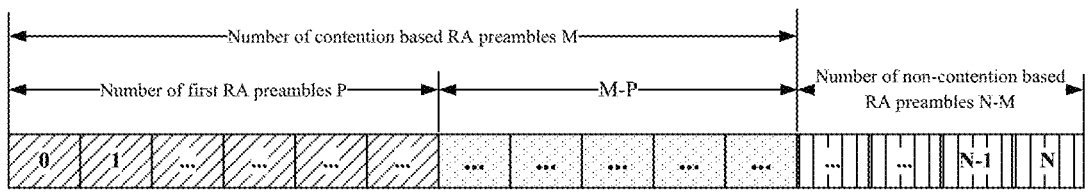
FIG. 3 is a schematic diagram of the division of preambles for the contention based random access and non-contention based random access on a premise of increasing the number of available preambles in a cell according to a preferred embodiment of the present disclosure.

FIG. 3 is a schematic diagram of the division of preambles for the contention and non-contention based random access on a premise of increasing the number of available preambles in a cell according to a preferred embodiment of the present disclosure. As shown in FIG. 3, the increasing the number of available preambles in a cell is the manner of N. The N may be determined in the predefined manner, or configured by the high-layer RRC signaling (for example, the RACH-ConfigCommon configuration, that is, to introduce available preamble number parameter in the cell into the field), or configured by the physical layer DCI signaling (the UE dedicated DCI signaling, common DCI signaling, group DCI signaling, DL grant and newly-designed DCI signaling). On the basis of this manner, a new number of RA-Preambles value may be correspondingly configured according to the high-layer RRC signaling (for example, the RACH-ConfigCommon) and/or the physical layer DCI signaling (the UE dedicated DCI signaling, common DCI signaling, group DCI signaling, DL grant and newly-designed DCI signaling) so as to determine a new number of preambles used in the non-contention based random access. Optionally, the new number of preambles used in the non-contention based random access may be correspondingly configured according to the high-layer RRC signaling (for example, the RACH-ConfigCommon) and/or the physical layer DCI signaling (the UE dedicated DCI signaling, common DCI signaling, group DCI signaling, DL grant and newly-designed DCI signaling) so as to determine the new number of RA-Preambles value. The new number of RA-Preamble value and/or the number of preambles used in the non-contention based random access is designated in the predefined manner.

Figure 4:
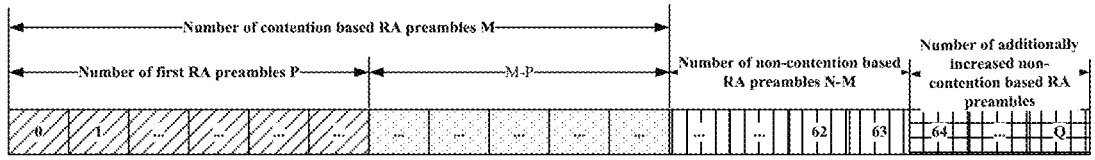
FIG. 4 is a schematic diagram of additionally increased preambles based on the non-contention based random access according to a preferred embodiment of the present disclosure.

FIG. 4 is a schematic diagram of additionally increased preambles based on the non-contention based random access according to a preferred embodiment of the present disclosure. As shown in FIG. 4, the additionally increased preambles are used in the non-contention based random access method, and the index and/or number (for example, N−64 is the number of additionally increased preambles and N is the total number of available preambles in the cell which includes 64 existing preambles and the number of the additionally increased preambles) of additionally increased preambles may be configured via the high-layer RRC signaling (for example, the RACH-ConfigCommon configuration, that is, to introduce the parameter of the number of additional preambles used in the non-contention access in the cell into the field) and/or physical layer signaling (the UE dedicated DCI signaling, common DCI signaling, group DCI signaling, DL grant and newly-designed DCI signaling) and/or predefined manner and/or a manner pre-agreed by the base station and the UE.

Optionally, if random access triggered by the handover is rare, the number of preambles used in the handover scenario may be deceased, and the number of decreased preambles is used to trigger the random access on the basis of the downlink data arrival event.

Preferred Embodiment 2

This preferred embodiment gives a method for determining PRACH time domain resources.

In method 1, the PRACH time domain resources are configured via the high-layer RRC.

The method 1 may be implemented in at least one of the following manners described below.

In manner 1, the PRACH time domain position pattern is configured by the high-layer RRC signaling.

There are two ways to use the PRACH time domain position pattern configured by the high-layer RRC. One is that the PRACH time domain position pattern is valid immediately once configured by the high-layer RRC. Another is that the PARCH time domain position pattern is not valid immediately once configured by the high-layer RRC, but become valid when at least one of time domain positions in the PRACH time domain pattern is triggered by the physical layer DCI signaling (the UE dedicated DCI signaling, common DCI signaling, group DCI signaling, DL grant and newly-designed DCI signaling), or become valid when at least one of time domain positions in the PRACH time domain pattern is triggered in a specific implication manner.

The PRACH time domain resource manner may be configured according to existing RRC signaling, or a PRACH time domain resource position or PRACH time domain resource position pattern dedicatedly used in the LAA is configured according to the high-layer RRC.

Figure 5:
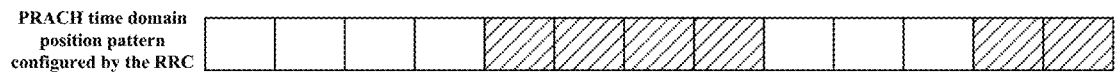
FIG. 5 is a schematic diagram of the PRACH time domain pattern configured by high-layer RRC signaling and triggering the enabling of PRACH resource by physical layer DCI signaling according to a preferred embodiment of the present disclosure.
Figure 5:
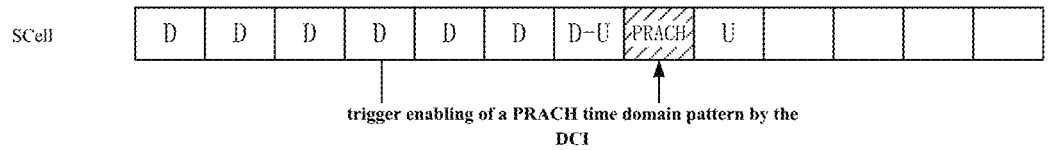

Manner 1 is described in detail below. For example, FIG. 5 is a schematic diagram of the PRACH time domain pattern configured by high-layer RRC signaling and PRACH resource enables triggered by physical layer DCI signaling according to a preferred embodiment of the present disclosure. As shown in FIG. 5, the high-layer RRC configures the PRACH time domain resource position pattern in a period of time, and whether the PRACH time domain pattern configured by the RRC is enabled or not depends on the dynamitic triggering from the physical layer DCI signaling. The DCI signaling carries a field occupying 2 bits or 3 bits, which is used to indicate that a PRACH time domain resource enable (preferably, after triggering the reception of the DCI signaling, a first PRACH time domain resource position or a second PRACH time domain resource position or a specific PRACH time domain resource position) is triggered, or that after triggering the reception of the DCI signaling, first t PRACH time domain resource enables are triggered, or that after triggering the reception of the DCI signaling, all PRACH time domain resource position enables are triggered, or that after triggering the reception of the DCI signaling, PRACH time domain enables on the odd positions or even positions are triggered.

Preferably, the PRACH time domain position resource pattern configured by the RRC may be composed of continuous or discrete PRACH time domain resource positions in a unit time.

In manner 2, the period or the period set in which the PRACH time domain resources occur and/or the offset of the PRACH time domain position in the period is configured by the high-layer RRC.

Preferably, the period T in which the PRACH time domain resources configured by the high-layer RRC signaling occur is less than the maximum uplink transmission duration, or the period T is related to the uplink transmission duration. The configured period T may be adjusted according to uplink or downlink traffic statistics in a period of time or adjusted according to statistics or average value of the uplink transmission duration in a period of time.

The manner 2 is described via an example. Assuming that the period in which the PRACH time domain resources configured by the high-layer RRC occur is 2 ms, there are two situations described below.

One situation is that once the UE detects downlink transmission end information (for example, the common DCI signaling) on the basis of the PRACH period T configured by a network side, the period T in which the PRACH time domain position configured by the high-layer RRC is enabled. Optionally, the start position of the PRACH time domain resources defaults to a first time domain resource in the uplink (the time domain resource may be one subframe, part subframes, two symbols, two subframes or three subframes), the PRACH time domain resources occur by the period T in the uplink transmission burst, and regardless of whether the UE transmits the preamble or not, the PRACH time domain resource periodically occurring in the uplink transmission burst are all valid.

Another situation is that, optionally, once the UE transmits the preamble at one of corresponding periodical PRACH time domain resource positions in the uplink transmission burst, the PRACH time domain resource positions after the PRACH time domain resource in the uplink transmission burst becomes invalid.

The manner 2 is described in another example. Assuming that the set of periods in which the PRACH time domain resources configured by the high-layer RRC occur is {1 ms, 2 ms, 3 ms, 4 ms, 5 ms, 6 ms, 10 ms}, the terminal UE adaptively chooses the period in which the PRACH time domain resources occur in the uplink transmission burst according to the length of uplink transmission burst, the base station selects a period value from the period set configured by the RRC and notifies the UE of the period value according to a specific rule. The specific rule is the uplink and/or downlink transmission service, or is based on the uplink and/or downlink MCOT length. At this moment, whether the period become valid or not depends on the downlink transmission burst, that is, the period becomes valid once the downlink transmission ends. Alternatively, the period becomes valid immediately once configured. Alternatively, whether the period becomes valid or not is related to the physical layer DCI signaling. For example, when the UE detects the UE dedicated DCI signaling, common DCI signaling, group DCI signaling, DL grant, or newly-designed DCI signaling, the period T is enabled. The PRACH time domain resource start point is related to the downlink transmission burst end. Alternatively, according to the received UE dedicated DCI signaling, common DCI signaling, group DCI signaling, DL grant or newly-designed DCI signaling, the subframe position n determines the PRACH time domain resource start point according to a specific timing relationship n+k, where k is a positive integer greater than or equal to 1, or greater than or equal to 4. Preferably, k is 1, 2, 3, 4, 5, 6, or 7.

In manner 3, the index indicating the PRACH time domain position or position set is configured by the high-layer RRC signaling.

Corresponding tables of different uplink transmission duration and the PRACH time domain resource position are pre-defined. The high-layer RRC configures merely the configuration index value in the tables.

In manner 4, the time window length for transmitting the PRACH, and/or a PRACH time domain start position in the time window, and/or an interval, and/or a time window start position for transmitting PRACH is configured by the high-layer RRC signaling. The time window for transmitting the preamble, or the time window of the PRACH time domain resources may become valid once configured by the high-layer RRC. Alternatively, these time windows may be merely configured by the high-layer RRC but not become valid, and whether these time windows become valid or not is related to the physical layer DCI signaling, or these time windows become valid according to the implication manner. The implication manner includes a downlink transmission end subframe, or a UE LBT success moment, or a first uplink subframe implication.

The PRACH time domain resource start point is related to the downlink transmission burst end. Alternatively, according to the received UE dedicated DCI signaling, common DCI signaling, group DCI signaling, DL grant or newly-designed DCI signaling, the subframe position n is determined according to the specific timing relationship n+k, or is related to the first uplink subframe position. The time window may be located at the downlink transmission burst end position, or the first uplink subframe, or before or after or at the subframe position determined by the specific timing relationship. k is a positive integer greater than or equal to 1, or greater than or equal to 4. Preferably, k is 1, 2, 3, 4, 5, 6, or 7.

In method 2, the PRACH time domain resources are clearly notified via the physical layer DCI signaling. The high-layer RRC does not configure PRACH time domain resource information.

For method 2, the PRACH time domain resource position index, and/or PRACH time domain resource position index set, and/or PRACH time window, and/or PRACH time domain resource start position index in the time window, and/or PRACH time domain resource interval in the time window, and/or the number of PRACH time domain resources in the time window is clearly indicated via the physical layer DCI signaling. These above parameters clearly indicated in the physical layer DCI signaling become valid immediately once indicated. Alternatively, these above parameters are merely indicated in the physical layer DCI signaling but do not become valid immediately, and the validation of these parameters may be triggered according to the common DCI signaling or a second DCI signaling, or triggered according to a first uplink subframe, or triggered according to the position of the subframe transmitting the physical layer DCI signaling and the specific timing relationship, or triggered at the success moment of the network side LBT, or triggered according to the predefined uplink subframe position, or triggered according to the downlink transmission burst end position.

In method 3, the combination of the high-layer RRC signaling configuration and the physical layer DCI signaling notification is adopted. The PRACH time domain resources are configured by the high-layer RRC signaling and the validation of the high-layer RRC configuration is triggered by the physical layer DCI signaling, which is the same as ways in the manner 1.

In method 4, the PRACH time domain resource position, or PRACH time domain resource position index set, or PRACH time window, or PRACH time domain resource start position, or PRACH time domain resource interval is implicitly indicated.

The implicit indication is performed according to the downlink transmission end position, or uplink specific subframe position, or success moment of UE uplink LBT, or PRACH time domain resource position determined by the subframe n position and the specific timing relationship n+k triggered according to the PDCCH order, or PRACH time domain resource position set, or PRACH time window, or PRACH time domain resource start position, or PRACH time domain resource interval, where k is a positive integer greater than or equal to 1, or greater than or equal to 4. Preferably, k is 1, 2, 3, 4, 5, 6, or 7.

The uplink specific subframe position may be a first uplink subframe, or a subframe at the end of the downlink transmission burst (preferably, the subframe at the end of the downlink transmission burst for transmitting the PRACH under the format 4), or a second uplink subframe, or an uplink subframe position pre-agreed by the base station and the UE or indicated by the high-layer RRC.

Preferred Embodiment 3

This preferred embodiment gives a method for determining PRACH frequency domain resources.

Due to the ETSI regulatory requirement that the transmitting signal meet at least 80% of the bandwidth, PRACH frequency domain resources occupy only 6 PRBs in the existing LTE technology, which does not meet the ETSI regulatory requirement about the bandwidth. In view of this, the LAA supports the discretion of the PRACH frequency domain from 6 PRBs to the entire bandwidth. The manner for the extension from 6 PRBs to the entire bandwidth includes the repetition for z times in the frequency domain.

On the basis of this, the method for determining PRACH frequency domain resources in the LAA includes at least one of the following methods described below.

In method 1, the PRACH frequency domain resource start PRB or RE position index, and/or the PRACH frequency domain resource start PRB or RE position index set, and/or the interval, and/or the repetition times z, and/or the frequency domain repetition times set, and/or the number of PRBs or REs included in each repetition is configured by the high-layer RRC signaling.

In method 2, the PRACH frequency domain resource start PRB or RE position index, and/or the interval, and/or the number of repetitions z, and/or the set of the frequency domain repetition times, and/or the number of PRBs or REs included in each repetition is clearly notified by the physical layer DCI signaling.

In method 3, the combination of the high-layer RRC signaling configuration and the physical layer DCI signaling notification is adopted.

The high-layer RRC configures at least one of the following: the PRACH frequency domain resource start PRB or RE position index, and/or the interval, and/or repetition times z, and/or the frequency domain repetition times set, and/or the number of PRBs or REs included in each repetition. The physical layer DCI configures remaining parameters in the above parameters, and/or gives an indication to the UE to adopt which number of repetitions in the frequency domain repetition times set.

If the high-layer RRC configures the PRACH frequency domain resource start PRB or RE position index set to the UE, the UE may adaptively chooses a PRACH frequency domain resource start point from the PRACH frequency domain resource start PRB or RE position index set, or a PRACH frequency domain resource start point is indicated to the UE or the UE group via the physical layer DCI signaling.

Preferred Embodiment 4

This preferred embodiment provides a method of raising a probability that the terminal user UE or the UE group successfully receives the RAR. For scenarios supporting the RAR transmission on the unlicensed carrier, for example, the LAA DC scenario or Standalone scenario, whether the RAR can transmitted on the unlicensed carrier is related to the LBT result of the base station side. Therefore, the manner, specified in the existing protocol, of determining the time window size or time window in which the UE receives the RAR may not be suitable for the scenarios in which the RAR is transmitted on the unlicensed carrier.

In the related LTE technology, the UE transmits the preamble on the nth subframe and monitors the RAR response of the base station in the n+3 subframe to the n+3+RA-ResponseWindowSize.

Optionally, since the LBT result of the base station side affects the transmission of the RAR, in order to improve the RAR transmitting opportunity or increase the success probability of receiving the RAR response by the UE side, at least one of the following manners described below may be used.

In manner 1, a start point of the new RAR transmitting time window or time window in which the UE receives the RAR on the base station is dynamically indicated.

Figure 6:
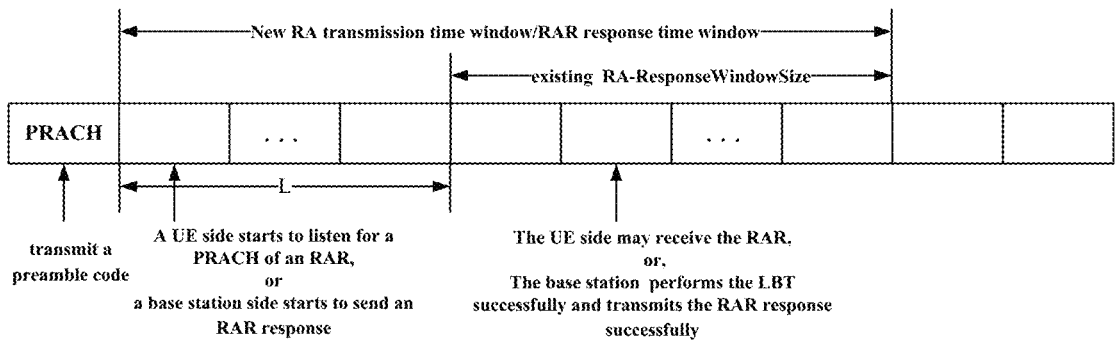
FIG. 6 is a schematic diagram of a new RAR transmission time window or an RAR response time window according to a preferred embodiment of the present disclosure.

The new RAR transmitting time window or time window length in which the UE receives the RAR on the base station is a length of +RA-ResponseWindowSize, that is from the dynamically indicated start point of the new RAR transmitting time window or time window in which the UE receives the RAR on the base station to the n+3 subframe. Preferably, 3 in an n+3 formula may be denoted as a parameter L. FIG. 6 is a schematic diagram of a new RAR transmitting time window or an RAR response time window according to a preferred embodiment of the present disclosure. As shown in FIG. 6, the start point of the new RAR transmitting time window or time window in which the UE receives the RAR on the base station is the end of the subframe n for the UE transmitting the preamble or the end of the subframe for the base station receiving the preamble.

The time domain range in which the base station side transmits the RAR is that: starting from the subframe n in which the base station receives the preamble, the base station transmits the RAR from the subframe n+k to n+k+L+RA-ResponseWindowSize. Correspondingly, the UE side transmits the preamble on the nth subframe and monitors the RAR response of the base station in the n+k subframe to the n+k+L+RA-ResponseWindowSize. The L+RA-ResponseWindowSize is the new time window in which the base station transmits the RAR or the new time window in which the UE receives the RAR, as shown in FIG. 6.

k and/or L and/or the time window start point for transmitting the RAR by the base station and/or the time window start point for receiving the RAR by the UE is configured by the high-layer RRC signaling, or notified by the physical layer DCI signaling (the PDCCH order signaling, or UE dedicated DCI signaling, or common DCI signaling, or group DCI signaling, or DL grant, or newly-designed DCI signaling), or pre-agreed by the base station and the UE.

The RA-ResponseWindowSizepredefined is configured by the high-layer RRC signaling, or configured by the physical layer DCI signaling, or pre-agreed by the base station and the UE.

In manner 2, the RA-ResponseWindowSize length is increased.

The RA-ResponseWindowSize may be configured to a maximum of 10 ms and is configured by the high-layer RRC signaling in the existing protocol.

Since the success probability for the base station transmitting the RAR is improved, the LAA RA-ResponseWindowSize may be configured by the high-layer RRC signaling, or notifies by the physical layer DCI signaling to the UE, or pre-agreed by the base station and the UE. The value range of the LAA RA-ResponseWindowSize is [1, a1], where a1 is a positive integer greater than or equal to 10.

In manner 3, additional RAR transmitting time windows are increased or additional RAR transmitting times are increased.

The LAA still uses the RAR response receiving time window or RAR transmitting time window defined in the existing LTE protocol, but after the RAR transmitting or receiving time window, additional RAR transmitting time window are increased.

Preferably, a time domain offset exists between the additional RAR transmitting time window start point and the existing RAR transmitting or receiving time window. The time domain offset is configured by the high-layer RRC, and/or notified by the physical layer DCI signaling to the UE, and/or pre-agreed by the base station and the UE, or configured by the MAC layer signaling. Optionally, the time domain offset may be 0 or an integer greater than or equal to 0.

Preferably, time domain resources transmitted by the RAR in the additional RAR transmitting time windows may be continual or discrete in terms of the time domain. Optionally, a time domain offset exists between start RAR time domain resources in the additional RAR transmitting time windows and the start point of additional RAR transmitting time windows. Optionally, the time domain offset in the additional RAR transmitting time windows may be 0 or an integer greater than or equal to 0. The time domain offset in the additional RAR transmitting time windows is configured by the high-layer RRC, and/or notified by the physical layer DCI signaling to the UE, and/or pre-agreed by the base station and the UE, or configured by the MAC layer signaling.

In manner 4, a higher LBT priority levels are configured to the RAR. That is, the LBT mechanism performed for transmitting the RAR is related to the priority levels. In other words, the RAR response has a higher priority level or a rapider random access mechanism, such as an LBT Cat2 mechanism of the 25 us or an LBT mechanism similar to a DRS and an LBT parameter corresponding to the priority level 1, for example a minimum contention window is 0, a maximum contention window is 3, and n in the defer period is a Cat4 LBT which is 0 or 1.

The RAR response of the base station may be transmitted on the licensed carrier or on the unlicensed carrier.

Preferred Embodiment 5

This preferred embodiment provides a method of addressing the problem of raising power for transmitting the preamble caused by the random access failure.

In the related LTE technology, when the UE does not receive the RAR response of the base station in the RAR receiving time window, it is considered that the random access fails. At this moment, if the maximum random access attempt times, PreambleTransMax, is not reached, the UE, on the basis of the last transmitting power, raises the power, PowerRampingStep, to transmit the next preamble to improve the probability of successful transmission.

For the LAA, the UE fails to obtain the use right of the unlicensed carrier via the contention in at least one of the following: a PRACH time-frequency domain resource or time domain resource set for transmitting the preamble, and corresponding PRACH time domain resources for transmitting the preamble in the PRACH time window which are configured by the high-layer RRC and/or indicated by the physical layer DCI signaling and/or indicated in a manner pre-agreed by the base station and the UE and/or indicated in an implicit manner, thereby causing the failure of preamble.

It is obviously unreasonable to raise the power, PowerRampingStep when transmitting the preamble next time according to specifications in the LTE technology. Furthermore, the failure of the LBT on the UE side results in the increased times for transmitting the preamble, thereby causing incorrectly counting the actual preamble transmitting times.

In view of this, when the preamble fails to be transmitted normally due to the failure of the LBT on the UE side in the LAA, it is unnecessary for the UE to raise the power, PowerRampingStep in the next attempt to transmit the preamble and/or to count the number of times of preamble transmitting failure caused by the failure of the LBT on the UE side to the PreambleTransMax. On the basis of this, if the execution of LBT fails when the UE side transmits the preamble, the UE notifies the MAC layer of the information of LBT failure, that is the UE side needs to report or indicate that the current preamble transmission failure is caused by the LBT failure of the UE side to the MAC layer and/or RRC layer and/or the physical layer and/or MAC layer and/or RRC layer of the base station. Optionally, if the LBT that the UE transmits the preamble is performed successfully, the UE transmits an indication message of LBT success to the base station so as to distinguish the reason why the UE does not receive the RAR response. It is assumed that the base station and the UE may respectively receive the preamble transmitted by the UE and the RAR response transmitted by the base station as long as the base station or the UE successfully executes the LBT. Preferably, the MAC layer needs to set a counter to count the LBT failure or success and/or a counter to count the transmitting times of the preamble.

Optionally, although the UE side successfully transmits the preamble, the LBT of the base station side fails, so that the UE does not receive the RAR response of the base station in the corresponding RAR response time window, thereby causing the failure of the random access process. At this moment, if the random access fails due to the failure of the LBT on the base station, the UE needs to retransmit the preamble, so that it is obviously unreasonable for the UE to raise the power, PowerRampingStep, so as to transmit the next preamble according to specifications in the LTE technology. By adopting the same method as the UE side needs to retransmit the preamble due to the failure of the LBT execution, an indication message is transmitted for instructing not to raise the power or accumulate the preamble transmitting times due to the random access failure caused by the failure of the LBT on the base station side.

Resources of the above indication message for indicating the LBT success or failure on the UE side and/or the indication message for instructing the UE not to raise the power PowerRampingStep may be located on the licensed carrier or on the unlicensed carrier.

Preferred Embodiment 6

This preferred embodiment provides a method of increasing or improving the success probability for the UE or UE group to transmit the Msg3 message and/or for the base station to transmit the Msg4 in the contention-based random access manner.

The difference between the contention-based random access manner and the non-contention-based random access manner is that although the UE receives the RAR response transmitted by the base station and obtains the uplink time synchronization and uplink resources, whether the RAR response is transmitted to the UE or transmitted to other UEs is not determined. Since the preamble of the UE in the contention-based random access process is selected from the common resources, a probability that different UEs transmit the same preamble on the same time-frequency resources exists, so that the UE on the same time-frequency resources may receive the same RAR response via the same RA-RNTI. The UE does not know if there are other UEs that use the same time-frequency domain resources to perform the random access. Therefore, the UE needs to address the random access conflict via the subsequent Msg3 and Msg4 message.

For the LAA, in order to increase the success probability to transmit the Msg3 message, at least one of the following manners is adopted described below.

In manner 1, besides the TA, UL grant, preamble index and TC-RNTI, the Mgs2 further carries the time domain subframe position for transmitting an Msg3 message, and/or the time domain subframe position set for transmitting the Msg3 message, and/or the time window for transmitting the Msg3 message, and/or the offset of time domain resources for transmitting the Msg3 message at a start of the time window for transmitting the Msg3 message, and/or the time domain resource interval for transmitting the Msg3 message in the time window for transmitting the Msg3 message, and/or the number of times for transmitting the Msg3 message, and/or the number of time domain resources for transmitting an Msg3, and/or the timing relationship value for transmitting the Msg3 message.

In manner 2, the time domain recourse for transmitting the Msg3 message or the time domain resource set of the Msg3 message are determined via the specific timing relationship.

In the related LTE technology, the time domain recourse position of the Msg3 message is determined by the subframe n which receives the RAR response according to the timing relationship, n+k1, where k1 is a value greater than or equal to 6.

Since the LAA is opportunistic transmission, in order to improve the random access efficiency on the unlicensed carrier, the UE may determine the time domain resource position for transmitting the Msg3 message and/or the time domain subframe position set for transmitting the Msg3 message and/or the time window for transmitting the Msg3 message according to a new timing relationship. The new timing relationship is n+k2, where k2 is a value greater than or equal to 1, or greater than or equal to 4. Preferably, k2 is 1, and/or 2, and/or 3, and/or 4, and/or 5, and/or 6 and/or 7.

The k2 in the new timing relationship may be configured by the high-layer RRC signaling, and/or notified by the physical layer DCI signaling, and/or pre-agreed by the base station and the UE, and/or bound to the Msg3 message. For example, a corresponding timing relationship is n+k2 once the Msg3 is transmitted, where n is a subframe in which the UE receives the RAR response.

The time domain resources for transmitting the Msg3 message in the time window for transmitting the Msg3 message may be continual or discrete. Preferably, each subframe in the transmitting time window of the Msg3 message may be used to transmit the Msg3 message.

The Msg4 message also adopts a method of configuring the Msg4 transmitting time window or a method of increasing the time length of the counter so as to improve the success probability for transmitting the Msg4 message on the unlicensed carrier. In addition, it also may improve the LBT priority level corresponding to the Msg4 message transmitted on the base station.

At least one of the Msg1, Msg2, Msg3 and Msg4 in this preferred embodiment may be transmitted on the licensed carrier or transmitted on the licensed carrier. Before transmitted on the unlicensed carrier, the Msg message needs to execute the LBT mechanism to obtain the use right of the unlicensed carrier. The Msg message can be transmitted on the unlicensed carrier only on the premise that the use right of the unlicensed carrier is obtained.

Preferred Embodiment 7

This preferred embodiment provides a method in which different Msg messages and/or different PRACH formats correspond to different LBT priority levels in the random access process.

For the non-contention-based random access process, the Msg messages included in the RA process include Msg0, Msg2 and Msg3.

For the contention-based random access process, the Msg messages included in the RA process include Msg0, Msg2, Msg3 and Msg4.

The PRACH formats include a Format 0, Format 1, Format 2, Format 3, Format 4 and a new Format. A new format PRACH time domain is less than a specific subframe length (one subframe is equal to 12 or 14 OFDM symbols) and greater than one symbol. Preferably, the specific subframe length may be a length of a subframe or may be greater than a length of 3 subframes. The time domain structure of the new PRACH format still uses the CP+Preamble+GT structure in the existing technology, preamble lengths are different, and CP and GT time domain lengths are different from corresponding CP and GT time domain lengths in the existing technology.

From the perspective of fair coexistence between the LAA and the Wi-Fi system, different Msg messages and/or different PRACH formats correspond to different LBT priority levels.

The priority levels are divided according to the PRACH formats. Preferably, the priority order is:

format 0>format 1>format 2>format 3>format 4>new format;

format 0>format 1>format 2 and/or format 3>format 4>new format;

format 0>format 4>format 1>format 2>format 3>new format;

format 4>format 0>format 1>format 2>format 3>new format;

format 4>new format>format 0>format 1>format 2>format 3;

format 0>format 4>format 1>format 2 and/or format 3>new format;

format 4>format 0>format 1>format 2 and/or format 3>new format; or format 4>new format>format 0>format 1>format 2 and/or format 3.

The priority orders listed above are only partial, and any priority order of the different PRACH formats described above are also applicable to the different LBT priority methods corresponding to different PRACH formats proposed by the present disclosure.

The different Msg messages are divided according to the random access process. Preferably, the priority order is:

Msg0>Msg1>Msg2;                     Msg0>Msg2>Msg1;
Msg1>Msg0>Msg2;                     Msg1>Msg2>Msg0;
Msg2>Msg1>Msg0;                     Msg2>Msg0>Msg1;
Msg1>Msg2>Msg3>Msg4;     Msg1>Msg2>Msg4>Msg3;
Msg1>Msg3>Msg2>Msg4;     Msg1>Msg3>Msg4>Msg2;
Msg1>Msg4>Msg2>Msg3;     Msg1>Msg4>Msg3>Msg2;
Msg2>Msg1>Msg3>Msg4;     Msg2>Msg1>Msg4>Msg3;
Msg2>Msg3>Msg1>Msg4;     Msg2>Msg3>Msg4>Msg1;
Msg2>Msg4>Msg1>Msg3;     Msg2>Msg4>Msg3>Msg1;
Msg3>Msg1>Msg2>Msg4;     Msg3>Msg1>Msg4>Msg2;
Msg3>Msg2>Msg1>Msg4;     Msg3>Msg2>Msg4>Msg1;
Msg3>Msg4>Msg1>Msg2;     Msg3>Msg4>Msg2>Msg1;
Msg4>Msg1>Msg2>Msg3;     Msg4>Msg1>Msg3>Msg2;
Msg4>Msg2>Msg1>Msg3;     Msg4>Msg2>Msg3>Msg1;
Msg4>Msg3>Msg2>Msg1; or Msg4>Msg3>Msg1>Msg2.

Msg0 is information that indicates the preamble transmitted by the UE and/or PRACH time domain and/or frequency domain recourses, and/or signaling, for example, physical layer PDCCH order signaling. Msg1 is a preamble message transmitted by the UE to the base station. Msg2 is an RAR response message transmitted by the base station to the UE. Msg3 is a request message transmitted by the UE to the base station. Msg4 is a contention resolution result message transmitted by the base station to the UE.

The priority orders listed above are only partial, and priority orders of the different Msg messages which are divided independently or in any combination are also applicable to the different LBT priority methods corresponding to different Msg messages proposed by the present disclosure.

As the priority level increases, corresponding contention windows of the LBT Cat4 increases in turn, and/or the transmission duration increases or decreases or remains unchanged.

Several preferred examples are listed below, as shown in Table 1.

TABLE 1

| LBT Priority level | CWmin | CWmax | n | Transmission duration |
|---|---|---|---|---|
| 1 | 0 | 3 | 0 | 4 ms |
| 2 | 3 | 5 | 0 | 3 ms |
| 3 | 5 | 7 | 1 | 2 ms |
| 4 | 7 | 15 | 1 | 2 ms |

Different priorities may correspond to different LBT modes or correspond to different parameters or parameter values in the same LBT mode, where the LBT modes include LBT Cat2 and LBT Cat4. The CCA detection duration in the LBT Cat2 may be 16 us, 25 us, 34 us or 43 us. The values in the table are only illustrative values, but the parameter values are not limited to the values shown in the table.

Optionally, from the perspective of the UE side, in the random access process, the first Msg message (for example, the Msg1 message) may adopt the Cat4 LBT mechanism, the second Msg message (for example, the Msg3 message) may adopt an LBT mechanism (for example, the Cat2 LBT) which is simpler than that of the first Msg message or adopt an LBT parameter which is easier to access the channel, for example, a shorter contention window. For the same Msg message, if the Msg message is not transmitted for the first time due to the LBT failure, the same LBT mechanism and parameter as that last time or a shorter contention window or a faster LBT mechanism such as the Cat2 LBT may be adopted when the Msg message is transmitted the second time. The LBT mechanism or parameter method used by the Msg message transmitted by the base station side and the above UE side is also applicable to the Msg message transmitted by the base station side.

In addition, for the DC scenario, the MCG carrier and SCG carrier also correspond to different LBT priorities, or different carriers in the same MCG carrier or SCG carrier may also correspond to different LBT priorities.

Preferred Embodiment 8

This preferred embodiment provides a non-contention-based random access process. This embodiment is applicable to the handover process, downlink data arrival, positioning the UE and other situations. Besides the LAA scenario, it is also applicable to the LAA DC scenario and Standalone scenario.

In this preferred embodiment, the non-contention based random access process in the LAA includes steps described below.

In step 1, the terminal UE obtains the preamble and/or PRACH time domain and/or frequency domain resource information.

In the related technology, the preamble and/or PRACH time domain and/or frequency domain resources are dedicatedly configured by the base station for the UE via the PDCCH order in the non-contention based random access process.

For the LAA, LAA DC scenario or Standalone scenario, the terminal UE may obtain the preamble and/or PRACH time domain and/or frequency domain resources via the physical layer signaling and/or high-layer RRC signaling and/or MAC signaling and/or a combination thereof. The physical layer signaling includes the UE dedicated DCI signaling, common DCI signaling, group DCI signaling, DL grant and a combination thereof. The detailed method for obtaining the preamble and/or PRACH time domain and/or frequency domain resources is shown in the preferred embodiment 3.

Optionally, additional PRACH time domain resources and/or the PRACH time window length and/or the start PRACH time domain resources and/or the PRACH time domain resource size and/or the PRACH time domain resource interval and/or the number of PRACH resources and/or the PRACH time domain resource pattern and/or the PRACH frequency domain PRB start point and/or the times of PRACH frequency domain repetition may be obtained via the physical layer signaling and/or high-layer RRC signaling and/or MAC signaling and/or a combination thereof. The physical layer signaling includes the UE dedicated DCI signaling, common DCI signaling, group DCI signaling, DL grant and a combination thereof. The detailed method for obtaining the preamble and/or PRACH time domain and/or frequency domain resources is shown in the embodiment 3.

Optionally, the base station notifies the UE that the preamble and/or PRACH time domain and/or frequency domain resources may be transmitted on the unlicensed carrier and/or transmitted on the licensed carrier.

Before the preamble and/or PRACH time domain and/or frequency domain resources are transmitted on the unlicensed carrier, the base station executes the Listen-before-talk (LBT) mechanism to obtain the use right of the unlicensed carrier. The base station, when obtaining the unlicensed carrier via the contention, may transmit notification signaling to the UE on the unlicensed carrier. The base station, without obtaining the unlicensed carrier via the contention, may not transmit the above notification signaling to the UE on the unlicensed carrier. Preferably, the base station may adopt the LBT Cat4. Furthermore, parameters such as the contention window size used in the Cat4 may correspond to the priority levels. For example, the operation that the base station transmits the preamble and/or PRACH time domain and/or frequency domain resource information (marked as Msg0) to the UE corresponds to priority level 3, that is to correspond to the LBT Cat4, the minimum contention window is 15, the maximum contention window is 63, n in the defer period is 3 and the transmission duration is 8. Preferably, the faster Cat4 parameter may be further adopted, for example, the minimum contention window is 7, the maximum contention window is 16, n in the defer period is 1 and the transmission duration is 3 ms. The defer period is composed of a fixed CCA duration plus n slots. Preferably, the fixed CCA duration may be 16 us, and the slot may be 9 us.

The PRACH time domain resources may be at the subframe level, or at the symbol level. The PRACH time domain resources at the subframe level include one subframe, two subframes, three subframes or more than three subframes. The PRACH time domain resources at the symbol level include one symbol, two symbols, or more than two symbols.

The PRACH format includes the format0, format1, format2, format3 and format4.

In step 2, the terminal UE transmits the preamble on the available PRACH resources.

After the terminal UE receives the preamble transmitted by the base station and/or PRACH time domain and/or frequency domain resources, the LBT needs to be performed to obtain the use right of the unlicensed carrier before the corresponding PRACH time domain resources. The LBT mechanism may adopt the Cat2 LBT mechanism in which the CCA detection duration is 25 us or adopt the Cat4 LBT. Parameters such as the specific contention window size may be determined according to the priority level corresponding to the Msg1, for example, when the priority level is 2, correspondingly the minimum contention window is 1, the maximum contention window is 3 and n in the defer period is 0. The process that the UE transmits the preamble on the PRACH time domain resources is marked as the Msg1 message.

In step 3, the terminal UE receives the RAR response transmitted by the base station in the corresponding RAR receiving time window. The detailed description of the time window in which the UE receives the RAR is shown in the preferred embodiment 4.

In step 4, the terminal UE transmits an indication message when the terminal UE does not receive the RAR. The indication message is used for instructing the MAC not to raise the power, that is not to perform the Power ramping. For details, see the method in the preferred embodiment.

In this embodiment, the message may be transmitted on the licensed carrier or transmitted on the licensed carrier in the non-contention-based random access process.

Through the above embodiment and the preferred embodiment, the random access process of the UE implements the following optimization described below.

(1) A corresponding relationship between different Msg messages and/or PRACH formats and the LBT priority levels is introduced.

(2) A method of increasing preamble for the non-contention based random access is given below (in the related LTE technology, the number of preambles for the non-contention based random access only is 4 while the number of the preambles for the non-contention based random access in the handover scenario is 8. In addition, the non-contention based random access method is currently supported in the LAA scenario. On the basis of this, 4 preambles in the related technology are obviously insufficient in the scenario that multiple UEs need to perform the random access).)

In method 1, the same preamble index is configured on a group of UEs. The group of UEs may be UEs in the TAG group. Optionally, the TAG group may be divided according to the distance between the base station and the base station, and/or re-divided according to the TA value reported by the UE in a period of time, and/or re-divided according to the TA value reported by the UE last time.

In method 2, the number of preambles for the non-contention based random access is extended.

The number of preambles used in the contention based random access is decreased and the decreased preambles are used as preambles of the random access situation triggered by the downlink data arrival event.

The RRC layer reconfigures the LAA number of RA-Preambles whose number is less than 52.

It is to be noted that the number of preambles used in the non-contention based random access may be also changed and for example, the number of preambles used in the non-contention based random access of the handover scenario is decreased and the decreased preambles are used as preambles of the random access situation triggered by the downlink data arrival event.

In method 3, the number of available preambles in the cell is increased.

The increased preambles are used in the non-contention based random access.

The number of preambles used in the non-contention based random access is re-divided on the basis of the number of available preambles in a new cell.

That is, the number of preambles used in the random access process in increased and the increased preambles are used in the non-contention based random access; the total number of preambles after the number of preambles is increased is reallocated so as to be used as preambles used in the contention based random access and preambles used in the non-contention based random access; and of course, the configured preambles used in the non-contention based random access may be greater than preambles used in the non-contention based random access in the related technology.

(3) A method of determining the PRACH using resources is given below.

In method 1, the PRACH time domain resources are configured via the high-layer RRC.

The high-layer RRC signaling configures the PRACH time domain position pattern.

The high-layer RRC signaling configures the period or the period set in which the PRACH time domain resources occur and/or the offset of the PRACH time domain position in the period.

The high-layer RRC signaling configures the index indicating the PRACH time domain position or position set.

Corresponding tables of different uplink transmission duration and the PRACH time domain resource position are pre-defined. The high-layer RRC configures only the configuration index value in the tables.

The high-layer RRC configures the time window length for transmitting the PRACH, and/or the PRACH time domain start position in the time window, and/or an interval.

The time window for transmitting the preamble, or the time window of the PRACH time domain resources may become valid once configured by the high-layer RRC. Alternatively, these time windows may be merely configured by the high-layer RRC but not become valid, and whether these time windows become valid or not is related to the physical layer DCI signaling, or these time windows become valid according to the implication manner. The implication manner includes a downlink transmission end subframe, or a UE LBT success moment, or a first uplink subframe implication.

In method 2, the PRACH time domain resources are clearly notified via the physical layer DCI signaling. The high-layer RRC does not configure PRACH time domain resource information.

First physical layer DCI signaling is used for indicating the PRACH time domain resource position index, and/or PRACH time domain resource position index set, and/or PRACH time window, and/or PRACH time domain resource start position index in the time window, and/or PRACH time domain resource interval in the time window, and/or the number of PRACH time domain resources in the time window.

At least one of enables in the PRACH time domain resources is triggered by second physical layer DCI signaling.

In method 3, the combination of the high-layer RRC signaling configuration and the physical layer DCI signaling notification is adopted. The PRACH time domain resources are configured by the high-layer RRC signaling and the validation of the high-layer RRC configuration is triggered by the physical layer DCI signaling, which is the same as ways in the manner 1.

In method 4, the PRACH time domain resource position, or PRACH time domain resource position index set, or PRACH time window, or PRACH time domain resource start position, or PRACH time domain resource interval is indicated via the implication manner.

(4) A method of determining the PRACH frequency domain resources is given below.

In method 1, the PRACH frequency domain resource start PRB or RE position index, and/or the PRACH frequency domain resource start PRB or RE position index set, and/or the interval, and/or the number of repetitions z, and/or the set of the number of frequency domain repetitions, and/or the number of PRBs or REs included in each repetition is configured by the high-layer RRC signaling.

In method 2, the PRACH frequency domain resource start PRB or RE position index, and/or the interval, and/or the number of repetitions z, and/or the set of the number of frequency domain repetitions, and/or the number of PRBs or REs included in each repetition is clearly notified by the physical layer DCI signaling.

In method 3, the combination of the high-layer RRC signaling configuration and the physical layer DCI signaling notification is adopted.

The high-layer RRC configures at least one of the following: the PRACH frequency domain resource start PRB or RE position index, and/or the interval, and/or the number of repetitions z, and/or the set of the number of frequency domain repetitions, and/or the number of PRBs or REs included in each repetition. The physical layer DCI configures remaining parameters in the above parameters, and/or gives an indication to the UE to adopt which number of repetitions in the set of the number of frequency domain repetitions.

(5) A method of increasing the success probability that the user equipment (UE) or the UE group receives the RAR is as follow:
introducing an L value;
increasing the RA-ResponseWindowSize length;
increasing additional RAR transmitting time windows; or
increasing additional RAR transmitting times.

The UE transmits the preamble on the nth subframe and monitors the RAR response of the base station at the end of the n subframe to the n+L+RA-ResponseWindowSize.

In the RAR response time window, the UE transmits an indication message to the MAC when the base station fails to execute the LBT or when the random access fails due to the failure of execution of the LBT by the UE.

The indication message is used for instructing the UE not to raise the power, PowerRampingStep, and/or not to accumulate preamble transmitting failure times due to the LBT failure on the UE side into the PreambleTransMax when trying to transmit the preamble next time.

(6) In order to increase the success probability or opportunities to transmit the Msg3 message on the unlicensed carrier, at least one of the following described below is increased in the Msg2 message:
a time domain subframe position for transmitting an Msg3 message;
a time domain subframe position set for transmitting the Msg3 message;
a time window for transmitting the Msg3 message;
an offset of time domain resources for transmitting the Msg3 message at a start of the time window for transmitting the Msg3 message;
a time domain resource interval for transmitting the Msg3 message in the time window for transmitting the Msg3 message;
a number of times for transmitting the Msg3 message;
a number of time domain resources for transmitting an Msg3; and
a timing relationship value for transmitting the Msg3 message.

From the description of the embodiment and preferred embodiments described above, it will be apparent to those skilled in the art that the method of the embodiment described above may be implemented by software plus a necessary general-purpose hardware platform, or may of course be implemented by hardware, but in many cases, the former is a preferred implementation mode. Based on this understanding, the solutions provided by the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, or the like) to execute the method according to each embodiment of the present disclosure.

Device Embodiment

Embodiments of the present invention further provide a random access device and a user equipment, and the device is used for implementing the above-mentioned embodiments and preferred embodiments. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

Figure 7:
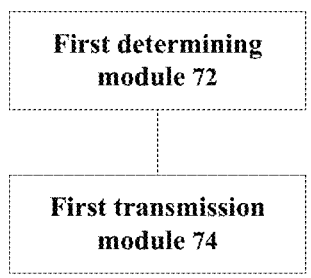
FIG. 7 is a block diagram of the structure of a random access device according to an embodiment of the present disclosure.

FIG. 7 is a block diagram of the structure of a random access device according to an embodiment of the present disclosure. As shown in FIG. 7, the device includes a first determining module 72 and a first transmission module 74 and the device is described below.

The first determining module 72 is configured to determine listen-before-talk (LBT) priority levels for performing an LBT mechanism corresponding to messages transmitted during a random access process, and/or LBT priority levels of an LBT mechanism corresponding to different physical random access channel (PRACH) formats. The first transmission module 74, connected to the first determining module 72 described above, is configured to transmit the messages for random access by means of the determined LBT priority levels corresponding to the messages and/or LBT priority levels corresponding to different PRACH formats after successfully performing the LBT mechanism.

Preferably, an LBT priority level order corresponding to the messages transmitted during the random access process includes one of the following: Msg0>Msg1>Msg2; Msg0>Msg2>Msg1; Msg1>Msg0>Msg2; Msg1>Msg2>Msg0; Msg2>Msg1>Msg0; Msg2>Msg0>Msg1; Msg1>Msg2>Msg3>Msg4; Msg1>Msg2>Msg4>Msg3; Msg1>Msg3>Msg2>Msg4;

Msg1>Msg3>Msg4>Msg2; Msg1>Msg4>Msg2>Msg3; Msg1>Msg4>Msg3>Msg2; Msg2>Msg1>Msg3>Msg4; Msg2>Msg1>Msg4>Msg3; Msg2>Msg3>Msg1>Msg4; Msg2>Msg3>Msg4>Msg1; Msg2>Msg4>Msg1>Msg3; Msg2>Msg4>Msg3>Msg1; Msg3>Msg1>Msg2>Msg4; Msg3>Msg1>Msg4>Msg2; Msg3>Msg2>Msg1>Msg4; Msg3>Msg2>Msg4>Msg1; Msg3>Msg4>Msg1>Msg2; Msg3>Msg4>Msg2>Msg1; Msg4>Msg1>Msg2>Msg3; Msg4>Msg1>Msg3>Msg2; Msg4>Msg2>Msg1>Msg3; Msg4>Msg2>Msg3>Msg1; Msg4>Msg3>Msg2>Msg1; and Msg4>Msg3>Msg1>Msg2; where Mgs0 is used by a base station to indicate a preamble transmitted by a user equipment (UE) and/or to transmit a PRACH time-frequency domain resource message of the preamble, Mgs1 is used by the UE to transmit a preamble message to the base station, Mgs2 is used by the base station to transmit a response message to the UE, Mgs3 is used by the UE to transmit a request message to the base station, and Mgs4 is used by the base station to transmit a contention resolution result message to the UE.

Preferably, a preamble set to which the preamble transmitted in an Msg1 message belongs may include: a third preamble set for contention based random access and a fourth preamble set for non-contention based random access, where the third preamble set and the fourth preamble set form a second preamble set.

Preferably, in a case that the number of the second preamble set is unchanged, the number of the fourth preamble set is increased or decreased by decreasing or increasing the number of the third preamble set; or on a premise that the number of the second preamble set is extended to obtain a first preamble set, the number of the fourth preamble set is increased while the number of the third preamble is kept unchanged by adding the number of newly added preambles in the second preamble set to the fourth preamble set; and on a premise that the number of the second preamble set is extended to obtain the first preamble set, the number of the third preamble set and/or the number of the fourth preamble set is configured via signaling according to an application scenarios; where the signaling includes high-layer RRC signaling or physical layer DCI signaling.

Figure 8:
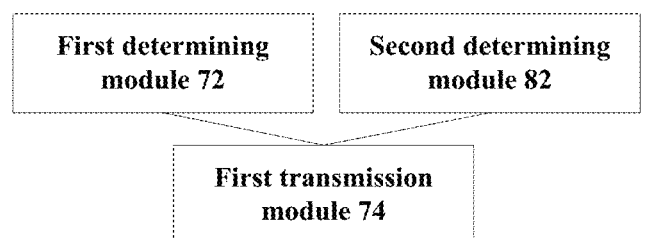
FIG. 8 is a preferred block diagram one of a structure of a random access device according to an embodiment of the present disclosure.

FIG. 8 is a preferred block diagram 1 of a structure of a random access device according to an embodiment of the present disclosure. As shown in FIG. 8, besides all modules shown in FIG. 7, the device further includes a second determining module 82. The second determining module 82 is described below.

The second determining module 82, connected to the first transmission module 74 described above, is configured to determine time domain resources for transmitting an Mgs1 by using at least one of the following parameters: a PRACH time domain position pattern, a period or a period set in which the PRACH time domain resources occur, an offset of the PRACH time domain position in the period, a PRACH time window start position, a period in which the PRACH time window occurs, a PRACH time window length, a time domain resource start position in the PRACH time window, a domain resource interval in the PRACH time window, a time domain resource end position in the PRACH time window, and the number of time domain resources in the PRACH time window.

Preferably, the second determining module 82 is further configured to determine time domain resources for transmitting the Mgs1 or parameters for determining the time domain resources in at least one of the following manners: high-layer radio resource control (RRC) signaling configuration, a physical layer downlink control information (DCI) signaling notification, a combination of the high-layer RRC signaling configuration and the physical layer DCI signaling notification, and a predetermined implication.

Preferably, the manner of using the physical layer DCI signaling notification includes: configuring PRACH time domain resources or candidate PRACH time domain resources or the parameters for determining the time domain resources via first physical layer DCI signaling, and triggering enables of the configured PRACH time domain resources or candidate PRACH time domain resources or the parameters for determining the time domain resources via second DCI signaling.

Preferably, the manner of using the combination of the high-layer RRC signaling configuration and the physical layer DCI signaling notification includes: configuring PRACH time domain resources or candidate PRACH time domain resources or the parameters for determining the time domain resources via the high-layer RRC signaling, and triggering enables of the configured PRACH time domain resources or candidate PRACH time domain resources or the parameters for determining the time domain resources via the DCI signaling.

Preferably, the manner of using the predetermined implication includes: triggering the configured PRACH time domain resources or candidate PRACH time domain resources or the parameters for determining the time domain resources at least one of the following positions: a downlink transmission burst end position, a position determined by a subframe n transmitted by a physical downlink control channel (PDCCH) order and a predetermined timing relationship between the subframe n and a triggering position, an uplink predetermined subframe position, an uplink predetermined subframe position after the downlink transmission burst, an uplink specific subframe in an uplink transmission burst, an uplink transmission burst, and a subframe position corresponding to the successful execution of the listen-before-talk (LBT) mechanism on the uplink.

Preferably, the predetermined timing relationship includes n+k, where n is a subframe position of the subframe transmitted by the physical downlink control channel (PDCCH) order, and k is a position integer greater than or equal to 1 or k is a positive integer greater than or equal to 4.

Figure 9:
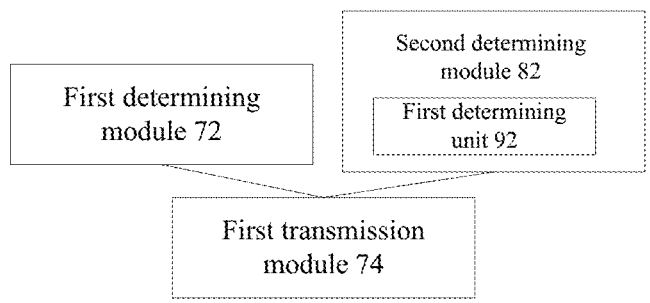
FIG. 9 is a preferred block diagram of a structure of a second determining module 82 in the random access device according to an embodiment of the present disclosure.

FIG. 9 is a preferred block diagram of a structure of a second determining module 82 in the random access device according to an embodiment of the present disclosure. As shown in FIG. 9, the second determining module 82 includes a first determining unit 92. The first determining unit 92 is described below.

The first determining unit 92 is configured to determine the k in at least one of the following manners: a physical layer DCI signaling notification, a high-layer RRC signaling notification, and a manner pre-agreed by the base station and the UE.

Preferably, the uplink predetermined subframe position includes at least one of the following: a first uplink subframe, a second uplink subframe, a first uplink subframe in the uplink transmission burst, a second uplink subframe in the uplink transmission burst, an uplink subframe whose subframe index is an even number in the uplink transmission burst, an uplink subframe whose subframe index is an odd number in the uplink transmission burst, and an uplink subframe pre-agreed by the base station and the UE.

Figure 10:
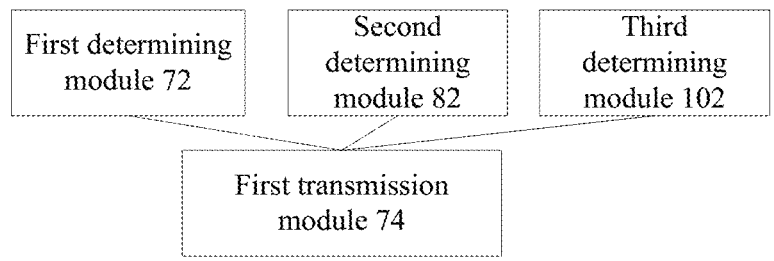
FIG. 10 is a preferred block diagram two of the structure of a random access device according to an embodiment of the present disclosure.

FIG. 10 is a preferred block diagram 2 of the structure of a random access device according to an embodiment of the present disclosure. As shown in FIG. 10, besides the structure shown in FIG. 8, the device further includes a third determining module 102. The third determining module 102 is described below.

The third determining module 102, connected to the first transmission module 74 described above, is configured to determine frequency domain resources for transmitting the Mgs1 in at least one of the following manners: high-layer radio resource control (RRC) signaling configuration, a physical layer downlink control information (DCI) signaling notification, and a combination of the high-layer RRC signaling configuration and the physical layer DCI signaling notification.

Preferably, a parameter for determining the frequency domain resources includes at least one of the following: a position index of a frequency domain start physical resource block (PRB) or a resource element (RE), a position index set of the frequency domain start physical resource block (PRB) or the resource element (RE), a frequency domain interval, the number of frequency domain repetitions z, a set of the number of frequency domain repetitions, and the number of the PRB and/or the number of the RE included in frequency domain repetitions.

Figure 11:
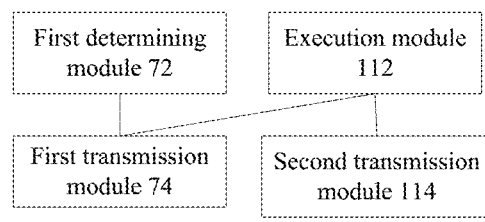
FIG. 11 is a preferred block diagram three of the structure of a random access device according to an embodiment of the present disclosure.

FIG. 11 is a preferred block diagram 3 of the structure of a random access device according to an embodiment of the present disclosure. As shown in FIG. 11, besides all structures shown in FIG. 7, the device further includes an execution module 112 and a second transmission module 114. The device is described below.

The execution module 112 is configured to execute the listen-before-talk (LBT) mechanism before transmitting the Mgs1. The second transmission module 114, connected to the execution module 112 described above, is configured to transmit a first indication message to the base station when the LBT mechanism is successfully performed, where the first indication message is used for indicating that the UE executes the LBT mechanism successfully or unsuccessfully; or transmit a second indication message to the base station when the LBT mechanism is unsuccessfully performed, where the second indication message is used for instructing an MAC layer not to perform a PreambleTransMax counter accumulation operation.

Figure 12:
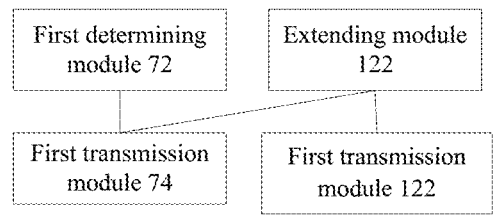
FIG. 12 is a preferred block diagram four of the structure of a random access device according to an embodiment of the present disclosure.

FIG. 12 is a preferred block diagram 4 of the structure of a random access device according to an embodiment of the present disclosure. As shown in FIG. 12, besides all structures shown in FIG. 7, the device further includes an extending module 122 and a first receiving module 124. The device is described below.

The extending module 122, connected to the first transmission module 74, is configured to extend a predetermined time window for the UE to receive an Mgs2 to obtain an extended time window. The first receiving module 124, connected to the extending module 122 described above, is configured to receive the Mgs2 in the extended time window.

Preferably, the extending module 122 is further configured to extend the predetermined time window for the UE to receive the Mgs2 to obtain the extended time window in at least one of the following manners: extending the predetermined time window for the UE to receive the Mgs2 by dynamically indicating a time start point at which the UE receives the Mgs2 to obtain an extended time window of an n+k subframe to n+k+L+RA-ResponseWindowSize, where n is a subframe for the UE to transmit the Mgs1, n+k is the time start point at which the UE receives the Mgs2, L is a predetermined time length, and RA-ResponseWindowSize is a length of the predetermined time window; extending the predetermined time window for the UE to receive the Mgs2 to obtain the extended time window by increasing the length of the predetermined time window; extending the predetermined time window for the UE to receive the Mgs2 to obtain the extended time window by increasing additional time windows for receiving the Mgs2; and extending the predetermined time window for the UE to receive the Mgs2 to obtain the extended time window by increasing an additional number of times to receive the Mgs2.

Preferably, L, k and RA-ResponseWindowSize are obtained in at least one of the following manners: high-layer radio resource control (RRC) signaling, physical layer downlink control information (DCI) signaling, and a manner pre-agreed by the base station and the UE.

Figure 13:
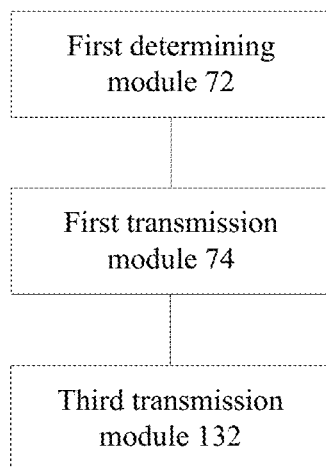
FIG. 13 is a preferred block diagram five of the structure of a random access device according to an embodiment of the present disclosure.

FIG. 13 is a preferred block diagram 5 of the structure of a random access device according to an embodiment of the present disclosure. As shown in FIG. 13, besides all structures shown in FIG. 7, the device further includes a third transmission module 132. The module is described below.

The third transmission module 132, connected to the first transmission module 74 described above, is configured to transmit a third indication message to a media access control (MAC) layer when the UE does not receive the Mgs2, where the third indication message is used for instructing the UE not to raise a power for transmitting the preamble or instructing the MAC layer not to perform the PreambleTransMax counter accumulation operation.

Figure 14:
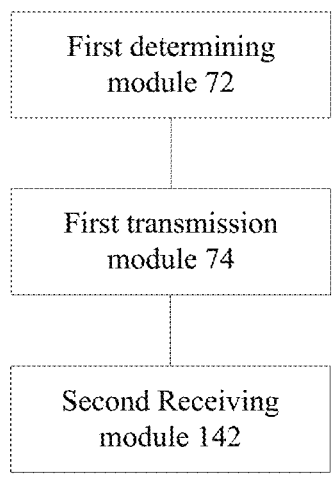
FIG. 14 is a preferred block diagram six of the structure of a random access device according to an embodiment of the present disclosure.

FIG. 14 is a preferred block diagram 6 of the structure of a random access device according to an embodiment of the present disclosure. As shown in FIG. 14, besides all structures shown in FIG. 7, the device further includes a second receiving module 142. The module is described below.

The second receiving module 142, connected to the first transmission module 74 described above, is configured to receive the Mgs2 from the base station after the Mgs1 is transmitted to the base station, where the Mgs2 carries a time advance (TA), an uplink grant (UL grant), a preamble index, and a temporary cell radio network temporary identifier (TC-RNTI).

Preferably, the Mgs2 further carries at least one of the following: a time domain subframe position for transmitting an Msg3 message, a time domain subframe position set for transmitting the Msg3 message, a time window for transmitting the Msg3 message, time domain resources and offset for transmitting the Msg3 message at a start of the time window for transmitting the Msg3 message, a time domain resource interval for transmitting the Msg3 message in the time window for transmitting the Msg3 message, the number of times for transmitting the Msg3 message, the number of time domain resources for transmitting an Msg3, and a predetermined timing relationship value between time domain resources for the UE to receive the Mgs2 transmitted by the base station and time domain resources for the UE to transmit the Msg3 message.

Preferably, the predetermined timing relationship value between time domain resources for the UE to receive the Mgs2 transmitted by the base station and time domain resources for the UE to transmit the Msg3 message includes: n+k2, where k2 is a value greater than or equal to 1, or k2 is a value greater than or equal to 4.

Preferably, the PRACH format includes: format 0, format 1, format 2, format 3, format 4 and new format, and an LBT priority level order of the LBT mechanism corresponding to different PRACH formats includes at least one of the following: format 0>format 1>format 2>format 3>format 4>new format; format 0>format 1>format 2 and/or format 3>format 4>new format; format 0>format 4>format 1>format 2>format 3>new format; format 4>format 0>format 1>format 2>format 3>new format; format 4>new format>format 0>format 1>format2>format3; format 0>format 4>format 1>format 2 and/or format 3>new format; format 4>format 0>format 1>format 2 and/or format 3>new format; and format 4>new format>format 0>format 1>format 2 and/or format 3.

It is to be noted that the various modules described above may be implemented by software or hardware. Implementation by hardware may, but may not necessarily, be performed in the following manners: the various modules described above are located in a same processor or their respective processors.

An embodiment of the present disclosure further provides a storage medium. Optionally, in this embodiment, the storage medium described above may be configured to store program codes for performing the steps described below.

In step S1, listen-before-talk (LBT) priority levels for performing an LBT mechanism corresponding to messages transmitted during a random access process, and/or LBT priority levels of an LBT mechanism corresponding to different physical random access channel (PRACH) formats are determined.

In step S2, the messages for random access are transmitted by means of the determined LBT priority levels corresponding to the messages and/or LBT priority levels corresponding to different PRACH formats after successfully performing the LBT mechanism.

Optionally, the storage medium is further configured to store program codes for performing the step described below.

In step S1, an LBT priority level order corresponding to the messages transmitted during the random access process includes one of the following: Msg0>Msg1>Msg2; Msg0>Msg2>Msg1; Msg1>Msg0>Msg2; Msg1>Msg2>Msg0; Msg2>Msg1>Msg0; Msg2>Msg0>Msg1; Msg1>Msg2>Msg3>Msg4; Msg1>Msg2>Msg4>Msg3; Msg1>Msg3>Msg2>Msg4; Msg1>Msg3>Msg4>Msg2; Msg1>Msg4>Msg2>Msg3; Msg1>Msg4>Msg3>Msg2; Msg2>Msg1>Msg3>Msg4; Msg2>Msg1>Msg4>Msg3; Msg2>Msg3>Msg1>Msg4; Msg2>Msg3>Msg4>Msg1; Msg2>Msg4>Msg1>Msg3; Msg2>Msg4>Msg3>Msg1; Msg3>Msg1>Msg2>Msg4; Msg3>Msg1>Msg4>Msg2; Msg3>Msg2>Msg1>Msg4; Msg3>Msg2>Msg4>Msg1; Msg3>Msg4>Msg1>Msg2; Msg3>Msg4>Msg2>Msg1; Msg4>Msg1>Msg2>Msg3; Msg4>Msg1>Msg3>Msg2; Msg4>Msg2>Msg1>Msg3; Msg4>Msg2>Msg3>Msg1; Msg4>Msg3>Msg2>Msg1; and Msg4>Msg3>Msg1>Msg2; where Mgs0 is used by a base station to indicate a preamble transmitted by a user equipment (UE) and/or to transmit a PRACH time-frequency domain resource message of the preamble, Mgs1 is used by the UE to transmit a preamble message to the base station, Mgs2 is used by the base station to transmit a response message to the UE, Mgs3 is used by the UE to transmit a request message to the base station, and Mgs4 is used by the base station to transmit a contention resolution result message to the UE.

Optionally, the storage medium is further configured to store program codes for performing the step described below.

In step S1, a preamble set to which the preamble transmitted in the Msg1 message belongs includes:

a third preamble set for contention based random access; and a fourth preamble set for non-contention based random access; where the third preamble set and the fourth preamble set form a second preamble set.

Optionally, the storage medium is further configured to store program codes for performing the step described below.

In step S1, in a case that the number of the second preamble set is unchanged, the number of the fourth preamble set is increased or decreased by decreasing or increasing the number of the third preamble set; or on a premise that the number of the second preamble set is extended to obtain a first preamble set, the number of the fourth preamble set is increased while the number of the third preamble is kept unchanged by adding the number of newly added preambles in the second preamble set to the fourth preamble set; and on a premise that the number of the second preamble set is extended to obtain the first preamble set, the number of the third preamble set and/or the number of the fourth preamble set is configured via signaling according to an application scenarios; where the signaling includes high-layer RRC signaling or physical layer DCI signaling.

Optionally, the storage medium is further configured to store program codes for performing the step described below.

In step S1, time domain resources or candidate PRACH time domain resources for transmitting the Mgs1 are determined by using at least one of the following parameters: a PRACH time domain position pattern, a period or a period set in which the PRACH time domain resources occur, an offset of the PRACH time domain position in the period, a PRACH time window start position, a period in which the PRACH time window occurs, a PRACH time window length, a time domain resource start position in the PRACH time window, a domain resource interval in the PRACH time window, a time domain resource end position in the PRACH time window, and the number of time domain resources in the PRACH time window.

Optionally, the storage medium is further configured to store program codes for performing the step described below.

In step S1, time domain resources for transmitting the Mgs1 or the parameters for determining the time domain resources are determined in at least one of the following manners: high-layer radio resource control (RRC) signaling configuration, a physical layer downlink control information (DCI) signaling notification, a combination of the high-layer RRC signaling configuration and the physical layer DCI signaling notification, and a predetermined implication.

Optionally, the storage medium is further configured to store program codes for performing the step described below.

In step S1, the manner of the physical layer DCI signaling notification includes: configuring PRACH time domain resources or candidate PRACH time domain resources or the parameters for determining the time domain resources via first physical layer DCI signaling, and triggering enables of the configured PRACH time domain resources or candidate PRACH time domain resources or the parameters for determining the time domain resources via second DCI signaling.

Optionally, the storage medium is further configured to store program codes for performing the step described below.

In step S1, the manner of the combination of the high-layer RRC signaling configuration and the physical layer DCI signaling notification includes: configuring PRACH time domain resources or candidate PRACH time domain resources or the parameters for determining the time domain resources via the high-layer RRC signaling, and triggering enables of the configured PRACH time domain resources or candidate PRACH time domain resources or the parameters for determining the time domain resources via the DCI signaling.

Optionally, the storage medium is further configured to store program codes for performing the step described below.

In step S1, the manner of using the predetermined implication includes: triggering the configured PRACH time domain resources or candidate PRACH time domain resources or the parameters for determining the time domain resources at least one of the following positions: a downlink transmission burst end position, a position determined by a subframe n transmitted by a physical downlink control channel (PDCCH) order and a predetermined timing relationship between n and a triggering position, an uplink predetermined subframe position, an uplink predetermined subframe position after the downlink transmission burst, an uplink specific subframe in an uplink transmission burst, an uplink transmission burst, and a subframe position corresponding to the successful execution of the listen-before-talk (LBT) mechanism on the uplink.

Optionally, the storage medium is further configured to store program codes for performing the step described below.

In step S1, the predetermined timing relationship includes n+k, where n is a subframe position of the subframe transmitted by the physical downlink control channel (PDCCH) order, and k is a position integer greater than or equal to 1 or k is a positive integer greater than or equal to 4.

Optionally, the storage medium is further configured to store program codes for performing the step described below.

In step S1, the k is determined in at least one of the following manners: a physical layer DCI signaling notification, a high-layer RRC signaling notification, and a manner pre-agreed by the base station and the UE.

Optionally, the storage medium is further configured to store program codes for performing the step described below.

In step S1, the uplink predetermined subframe position includes at least one of the following: a first uplink subframe, a second uplink subframe, a first uplink subframe in the uplink transmission burst, a second uplink subframe in the uplink transmission burst, an uplink subframe whose subframe index is an even number in the uplink transmission burst, an uplink subframe whose subframe index is an odd number in the uplink transmission burst, and an uplink subframe pre-agreed by the base station and the UE.

Optionally, the storage medium is further configured to store program codes for performing the step described below.

In step S1, frequency domain resources for transmitting the Mgs1 are determined in at least one of the following manners: high-layer radio resource control (RRC) signaling configuration, a physical layer downlink control information (DCI) signaling notification, and a combination of the high-layer RRC signaling configuration and the physical layer DCI signaling notification.

Optionally, the storage medium is further configured to store program codes for performing the step described below.

In step S1, a parameter for determining the frequency domain resources includes at least one of the following: a position index of a frequency domain start physical resource block (PRB) or a resource element (RE), a position index set of the frequency domain start physical resource block (PRB) or the resource element (RE), a frequency domain interval, the number of frequency domain repetitions z, a set of the number of frequency domain repetitions, and the number of the PRB and/or the number of the RE included in frequency domain repetitions.

Optionally, the storage medium is further configured to store program codes for performing the steps described below.

In step S1, the listen-before-talk (LBT) mechanism is executed before transmitting the Mgs1.

In step S2, a first indication message is transmitted to the base station when the LBT mechanism is successfully performed, where the first indication message is used for indicating that the UE executes the LBT mechanism successfully or unsuccessfully; or a second indication message is transmitted to the base station when the LBT mechanism is unsuccessfully performed, where the second indication message is used for instructing an MAC layer not to perform a PreambleTransMax counter accumulation operation.

Optionally, the storage medium is further configured to store program codes for performing the steps described below.

In step S1, a predetermined time window for the UE to receive the Mgs2 is extended to obtain an extended time window.

In step S2, the Mgs2 is received in the extended time window.

Optionally, the storage medium is further configured to store program codes for performing the steps described below.

In step S1, the predetermined time window for the UE to receive the Mgs2 is extended to obtain the extended time window in at least one of the following manners: extending the predetermined time window for the UE to receive the Mgs2 by dynamically indicating a time start point at which the UE receives the Mgs2 to obtain an extended time window of an n+k subframe to n+k+L+RA-ResponseWindowSize, where n is a subframe for the UE to transmit the Mgs1, n+k is the time start point at which the UE receives the Mgs2, L is a predetermined time length, and RA-ResponseWindowSize is a length of the predetermined time window; extending the predetermined time window for the UE to receive the Mgs2 to obtain the extended time window by increasing the length of the predetermined time window; extending the predetermined time window for the UE to receive the Mgs2 to obtain the extended time window by increasing additional time windows for receiving the Mgs2; and extending the predetermined time window for the UE to receive the Mgs2 to obtain the extended time window by increasing an additional number of times to receive the Mgs2.

Optionally, the storage medium is further configured to store program codes for performing the step described below.

In step S1, L, k and RA-ResponseWindowSize are obtained in at least one of the following manners: high-layer radio resource control (RRC) signaling, physical layer downlink control information (DCI) signaling, and a manner pre-agreed by the base station and the UE.

Optionally, the storage medium is further configured to store program codes for performing the step described below.

In step S1, a third indication message is transmitted to a media access control (MAC) layer when the UE does not receive the Mgs2, where the third indication message is used for instructing the UE not to raise a power for transmitting the preamble or instructing the MAC layer not to perform the PreambleTransMax counter accumulation operation.

Optionally, the storage medium is further configured to store program codes for performing the step described below.

In step S1, the Mgs2 is received from the base station after the Mgs1 is transmitted to the base station, where the Mgs2 carries a time advance (TA), an uplink grant (UL grant), a preamble index, and a temporary cell radio network temporary identifier (TC-RNTI).

Optionally, the storage medium is further configured to store program codes for performing the step described below.

In step S1, the Mgs2 further carries at least one of the following: a time domain subframe position for transmitting an Msg3 message, a time domain subframe position set for transmitting the Msg3 message, a time window for transmitting the Msg3 message, time domain resources and offset for transmitting the Msg3 message at a start of the time window for transmitting the Msg3 message, a time domain resource interval for transmitting the Msg3 message in the time window for transmitting the Msg3 message, the number of times for transmitting the Msg3 message, the number of time domain resources for transmitting an Msg3, and a predetermined timing relationship value between time domain resources for the UE to receive the Mgs2 transmitted by the base station and time domain resources for the UE to transmit the Msg3 message.

Optionally, the storage medium is further configured to store program codes for performing the step described below.

In step S1, a predetermined timing relationship value between time domain resources for the UE to receive the Mgs2 transmitted by the base station and time domain resources for the UE to transmit the Msg3 message includes: n+k2, where k2 is a value greater than or equal to 1, or k2 is a value greater than or equal to 4.

Optionally, the storage medium is further configured to store program codes for performing the step described below.

In step S1, the PRACH format includes: format 0, format 1, format 2, format 3, format 4 and new format, and an LBT priority level order of the LBT mechanism corresponding to different PRACH formats includes at least one of the following: format 0>format 1>format 2>format 3>format 4>new format; format 0>format 1>format 2 and/or format 3>format 4>new format; format 0>format 4>format 1>format 2>format 3>new format; format 4>format 0>format 1>format 2>format 3>new format; format 4>new format>format 0>format 1>format2>format3; format 0>format 4>format 1>format 2 and/or format 3>new format; format 4>format 0>format 1>format 2 and/or format 3>new format; and format 4>new format>format 0>format 1>format 2 and/or format 3.

Optionally, in this embodiment, the storage medium described above may include, but is not limited to, a U disk, a read-only memory (ROM), a random access memory (RAM), a mobile hard disk, a magnetic disk, an optical disk or another medium capable of storing program codes.

Optionally, in this embodiment, the processor executes the following steps according to program codes stored in the storage medium: listen-before-talk (LBT) priority levels for performing an LBT mechanism corresponding to messages transmitted during a random access process, and/or LBT priority levels of an LBT mechanism corresponding to different physical random access channel (PRACH) formats are determined; and the messages for random access are transmitted by means of the determined LBT priority levels corresponding to the messages and/or LBT priority levels corresponding to different PRACH formats after successfully performing the LBT mechanism.

Optionally, in this embodiment, the processor executes the following step according to program codes stored in the storage medium: an LBT priority level order corresponding to the messages transmitted during the random access process includes one of the following: Msg0>Msg1>Msg2; Msg0>Msg2>Msg1; Msg1>Msg0>Msg2; Msg1>Msg2>Msg0; Msg2>Msg1>Msg0; Msg2>Msg0>Msg1; Msg1>Msg2>Msg3>Msg4; Msg1>Msg2>Msg4>Msg3; Msg1>Msg3>Msg2>Msg4; Msg1>Msg3>Msg4>Msg2; Msg1>Msg4>Msg2>Msg3; Msg1>Msg4>Msg3>Msg2; Msg2>Msg1>Msg3>Msg4; Msg2>Msg1>Msg4>Msg3; Msg2>Msg3>Msg1>Msg4; Msg2>Msg3>Msg4>Msg1; Msg2>Msg4>Msg1>Msg3; Msg2>Msg4>Msg3>Msg1; Msg3>Msg1>Msg2>Msg4; Msg3>Msg1>Msg4>Msg2; Msg3>Msg2>Msg1>Msg4; Msg3>Msg2>Msg4>Msg1; Msg3>Msg4>Msg1>Msg2; Msg3>Msg4>Msg2>Msg1; Msg4>Msg1>Msg2>Msg3; Msg4>Msg1>Msg3>Msg2; Msg4>Msg2>Msg1>Msg3; Msg4>Msg2>Msg3>Msg1; Msg4>Msg3>Msg2>Msg1; and Msg4>Msg3>Msg1>Msg2; where Mgs0 is used by a base station to indicate a preamble transmitted by a user equipment (UE) and/or to transmit a PRACH time-frequency domain resource message of the preamble, Mgs1 is used by the UE to transmit a preamble message to the base station, Mgs2 is used by the base station to transmit a response message to the UE, Mgs3 is used by the UE to transmit a request message to the base station, and Mgs4 is used by the base station to transmit a contention resolution result message to the UE.

Optionally, in this embodiment, the processor executes the following step according to program codes stored in the storage medium: a preamble set to which the preamble transmitted in an Msg1 message belongs includes a third preamble set for contention based random access and a fourth preamble set for non-contention based random access, where the third preamble set and the fourth preamble set form a second preamble set.

Optionally, the storage medium is further configured to store program codes for performing the following steps: in a case that the number of the second preamble set is unchanged, the number of the fourth preamble set is increased or decreased by decreasing or increasing the number of the third preamble set; or on a premise that the number of the second preamble set is extended to obtain a first preamble set, the number of the fourth preamble set is increased while the number of the third preamble is kept unchanged by adding the number of newly added preambles in the second preamble set to the fourth preamble set; and on a premise that the number of the second preamble set is extended to obtain the first preamble set, the number of the third preamble set and/or the number of the fourth preamble set is configured via signaling according to an application scenarios; where the signaling includes high-layer RRC signaling or physical layer DCI signaling.

Optionally, in this embodiment, the processor executes the following step according to program codes stored in the storage medium: time domain resources or candidate PRACH time domain resources for transmitting the Mgs1 are determined by using at least one of the following parameters: a PRACH time domain position pattern, a period or a period set in which the PRACH time domain resources occur, an offset of the PRACH time domain position in the period, a PRACH time window start position, a period in which the PRACH time window occurs, a PRACH time window length, a time domain resource start position in the PRACH time window, a domain resource interval in the PRACH time window, a time domain resource end position in the PRACH time window, and the number of time domain resources in the PRACH time window.

Optionally, in this embodiment, the processor executes the following step according to program codes stored in the storage medium: time domain resources for transmitting the Mgs1 or the parameters for determining the time domain resources are determined in at least one of the following manners: high-layer radio resource control (RRC) signaling configuration, a physical layer downlink control information (DCI) signaling notification, a combination of the high-layer RRC signaling configuration and the physical layer DCI signaling notification, and a predetermined implication.

Optionally, in this embodiment, the processor executes the following step according to program codes stored in the storage medium: the manner of using the physical layer DCI signaling notification includes: configuring PRACH time domain resources or candidate PRACH time domain resources or the parameters for determining the time domain resources via first physical layer DCI signaling, and triggering enables of the configured PRACH time domain resources or candidate PRACH time domain resources or the parameters for determining the time domain resources via second DCI signaling.

Optionally, in this embodiment, the processor executes the following step according to program codes stored in the storage medium: the manner of using the combination of the high-layer RRC signaling configuration and the physical layer DCI signaling notification includes: configuring PRACH time domain resources or candidate PRACH time domain resources or the parameters for determining the time domain resources via the high-layer RRC signaling, and triggering enables of the configured PRACH time domain resources or candidate PRACH time domain resources or the parameters for determining the time domain resources via the DCI signaling.

Optionally, in this embodiment, the processor executes the following step according to program codes stored in the storage medium: the manner of using the predetermined implication includes: triggering the configured PRACH time domain resources or candidate PRACH time domain resources or the parameters for determining the time domain resources at least one of the following positions: a downlink transmission burst end position, a position determined by a subframe n transmitted by a physical downlink control channel (PDCCH) order and a predetermined timing relationship between the subframe n and a triggering position, an uplink predetermined subframe position, an uplink predetermined subframe position after the downlink transmission burst, an uplink specific subframe in an uplink transmission burst, an uplink transmission burst, and a subframe position corresponding to the successful execution of the listen-before-talk (LBT) mechanism on the uplink.

Optionally, in this embodiment, the processor executes the following step according to program codes stored in the storage medium: the predetermined timing relationship includes n+k, where n is a subframe position of the subframe transmitted by the physical downlink control channel (PDCCH) order, and k is a position integer greater than or equal to 1 or k is a positive integer greater than or equal to 4.

Optionally, in this embodiment, the processor executes the following step according to program codes stored in the storage medium: the k is determined in at least one of the following manners: a physical layer DCI signaling notification, a high-layer RRC signaling notification, and a manner pre-agreed by the base station and the UE.

Optionally, in this embodiment, the processor executes the following step according to program codes stored in the storage medium: the uplink predetermined subframe position includes at least one of the following: a first uplink subframe, a second uplink subframe, a first uplink subframe in the uplink transmission burst, a second uplink subframe in the uplink transmission burst, an uplink subframe whose subframe index is an even number in the uplink transmission burst, an uplink subframe whose subframe index is an odd number in the uplink transmission burst, and an uplink subframe pre-agreed by the base station and the UE.

Optionally, in this embodiment, the processor executes the following step according to program codes stored in the storage medium: time domain resources for transmitting the Mgs1 are determined in at least one of the following manners: high-layer radio resource control (RRC) signaling configuration, a physical layer downlink control information (DCI) signaling notification and a combination of the high-layer RRC signaling configuration and the physical layer DCI signaling notification.

Optionally, in this embodiment, the processor executes the following step according to program codes stored in the storage medium: a parameter for determining the frequency domain resources includes at least one of the following: a position index of a frequency domain start physical resource block (PRB) or a resource element (RE), a position index set of the frequency domain start physical resource block (PRB) or the resource element (RE), a frequency domain interval, the number of frequency domain repetitions z, a set of the number of frequency domain repetitions, and the number of the PRB and/or the number of the RE included in frequency domain repetitions.

Optionally, in this embodiment, the processor executes the following step according to program codes stored in the storage medium: the listen-before-talk (LBT) mechanism is performed before transmitting the Mgs1; and a first indication message is transmitted to the base station when the LBT mechanism is successfully performed, where the first indication message is used for indicating that the UE executes the LBT mechanism successfully or unsuccessfully; or a second indication message is transmitted to the base station when the LBT mechanism is unsuccessfully performed, where the second indication message is used for instructing an MAC layer not to perform a PreambleTransMax counter accumulation operation.

Optionally, in this embodiment, the processor executes the following step according to program codes stored in the storage medium: a predetermined time window for the UE to receive the Mgs2 is extended to obtain an extended time window; and the Mgs2 is received in the extended time window.

Optionally, in this embodiment, the processor executes the following step according to program codes stored in the storage medium: the predetermined time window for the UE to receive the Mgs2 is extended to obtain the extended time window in at least one of the following manners: extending the predetermined time window for the UE to receive the Mgs2 by dynamically indicating a time start point at which the UE receives the Mgs2 to obtain an extended time window of an n+k subframe to n+k+L+RA-ResponseWindowSize, where n is a subframe for the UE to transmit the Mgs1, n+k is the time start point at which the UE receives the Mgs2, L is a predetermined time length, and RA-ResponseWindowSize is a length of the predetermined time window; extending the predetermined time window for the UE to receive the Mgs2 to obtain the extended time window by increasing the length of the predetermined time window; extending the predetermined time window for the UE to receive the Mgs2 to obtain the extended time window by increasing additional time windows for receiving the Mgs2; and extending the predetermined time window for the UE to receive the Mgs2 to obtain the extended time window by increasing an additional number of times to receive the Mgs2.

Optionally, in this embodiment, the processor executes the following step according to program codes stored in the storage medium: L, k and RA-ResponseWindowSize are obtained in at least one of the following manners: high-layer radio resource control (RRC) signaling, physical layer downlink control information (DCI) signaling, and a manner pre-agreed by the base station and the UE.

Optionally, in this embodiment, the processor executes the following step according to program codes stored in the storage medium: a third indication message is transmitted to a media access control (MAC) layer when the UE does not receive the Mgs2, where the third indication message is used for instructing the UE not to raise a power for transmitting the preamble or instructing the MAC layer not to perform the PreambleTransMax counter accumulation operation.

Optionally, in this embodiment, the processor executes the following step according to program codes stored in the storage medium: the Mgs2 is received from the base station after the Mgs1 is transmitted to the base station, where the Mgs2 carries a time advance (TA), an uplink grant (UL grant), a preamble index, and a temporary cell radio network temporary identifier (TC-RNTI).

Optionally, in this embodiment, the processor executes the following step according to program codes stored in the storage medium: the Mgs2 further carries at least one of the following: a time domain subframe position for transmitting an Msg3 message, a time domain subframe position set for transmitting the Msg3 message, a time window for transmitting the Msg3 message, time domain resources and offset for transmitting the Msg3 message at a start of the time window for transmitting the Msg3 message, a time domain resource interval for transmitting the Msg3 message in the time window for transmitting the Msg3 message, the number of times for transmitting the Msg3 message, the number of time domain resources for transmitting an Msg3, and a predetermined timing relationship value between time domain resources for the UE to receive the Mgs2 transmitted by the base station and time domain resources for the UE to transmit the Msg3 message.

Optionally, in this embodiment, the processor executes the following step according to program codes stored in the storage medium: a predetermined timing relationship value between time domain resources for the UE to receive the Mgs2 transmitted by the base station and time domain resources for the UE to transmit the Msg3 message includes: n+k2, where k2 is a value greater than or equal to 1, or k2 is a value greater than or equal to 4.

Optionally, in this embodiment, the processor executes the following steps according to program codes stored in the storage medium: the PRACH format includes format 0, format 1, format 2, format 3, format 4 and new format, and an LBT priority level order of the LBT mechanism corresponding to different PRACH formats includes at least one of the following: format 0>format 1>format 2>format 3>format 4>new format; format 0>format 1>format 2 and/or format 3>format 4>new format; format 0>format 4>format 1>format 2>format 3>new format; format 4>format 0>format 1>format 2>format 3>new format; format 4>format 0>format 1>format2>format3; format 0>format 4>format 1>format 2 and/or format 3>new format; format 4>format 0>format 1>format 2 and/or format 3>new format; and format 4>new format>format 0>format 1>format 2 and/or format 3.

Optionally, for specific examples in this embodiment, reference may be made to the examples described in the above embodiments and optional implementation modes, and repetition will not be made in this embodiment.

Apparently, those skilled in the art should understand that each of the above-mentioned modules or steps of the present invention may be implemented by a general-purpose computing device, the modules or steps may be concentrated on a single computing device or distributed on a network formed by multiple computing devices, and optionally, the modules or steps may be implemented by program codes executable by the computing devices, so that the modules or steps may be stored in a storage device and executable by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present invention is not limited to any specific combination of hardware and software.

The above are only preferred embodiments of the present invention and are not intended to limit the present invention, and for those skilled in the art, the present invention may have various modifications and variations. Any modifications, equivalent substitutions, improvements and the like made within the spirit and principle of the present invention fall within the scope of the present invention.

INDUSTRIAL APPLICABILITY

The technical solutions provided by embodiments of the present disclosure may be applied to the random access process and execute the LBT mechanism for the random access according to the correspondence between different messages and/or the PRACH formats and the LBT priority levels. In such a way, the problem in the related art of the need of optimizing random access for a user equipment (UE) is resolved, thereby optimizing random access and improving the random access success rate.

What is claimed is:

1. A random access method, comprising:
   receiving a listen-before-talk (LBT) mechanism; and
   transmitting a LBT failure indication from physical layer to higher layers for informing LBT failure, by a User equipment (UE), after performing the LBT mechanism failure prior to uplink (UL) transmission, based on the received LBT mechanism;
   wherein, UL transmission comprises at least one of the following: preamble transmission, or Mgs1 transmission, or physical uplink shared channel (PUSCH) transmission;
   wherein, for the case of LBT failure for UL transmission including Mgs1 transmission or preamble transmission comprises:
   if LBT failure indication is not received from lower layers for preamble transmission, Power Ramping counter is increased; or
   if LBT failure indication is received from lower layers for preamble transmission, Power Ramping counter is not increased.

2. The method of claim 1, wherein, if preamble is not transmitted due to LBT failure, comprises one of the following:
- LBT mechanism for next preamble transmission is the same as that of previous preamble transmission; or
- contention window size for next preamble transmission is shorter than that of previous preamble transmission; or
- LBT mechanism for next preamble transmission uses Cat2 LBT; or
- transmission power for next preamble transmission is same as that of previous preamble transmission.

3. The method of claim 2, wherein duration of clear channel assessment (CCA) detection of Cat2 LBT comprises: 16 us, or, 25 us, or, 34 us, or, 43 us.

4. The method of claim 1, wherein the LBT mechanism comprises: Cat2 LBT, or, Cat4 LBT.

5. The method of claim 4, wherein duration of clear channel assessment (CCA) detection of Cat2 LBT comprises: 16 us, or, 25 us, or, 34 us, or, 43 us.

6. The method of claim 4, wherein parameter of Cat4 LBT comprises at least one of: LBT priority level, a minimum value of Contention window size, a maximum value of contention window size, channel occupancy time.

7. A user equipment (UE), comprising a processor and a storage device storing computer executable instructions that, when executed by the processor, cause the processor to perform a random access method comprising:
- receiving a listen-before-talk (LBT) mechanism; and
- transmitting a LBT failure indication from physical layer to higher layers for informing LBT failure, by the UE, after performing the LBT mechanism failure prior to uplink (UL) transmission, based on the received LBT mechanism;
- wherein, UL transmission comprises at least one of the following: preamble transmission, or Mgs1 transmission, or physical uplink shared channel (PUSCH) transmission;
- wherein, for the case of LBT failure for UL transmission including Mgs1 transmission or preamble transmission comprises:
- if LBT failure indication is not received from lower layers for preamble transmission, Power Ramping counter is increased; or
- if LBT failure indication is received from lower layers for preamble transmission, Power Ramping counter is not increased.

8. The UE of claim 7, wherein, if preamble is not transmitted due to LBT failure, comprises one of the following:
- LBT mechanism for next preamble transmission is the same as that of previous preamble transmission; or
- contention window size for next preamble transmission is shorter than that of previous preamble transmission; or
- LBT mechanism for next preamble transmission uses Cat2 LBT; or
- transmission power for next preamble transmission is same as that of previous preamble transmission.

9. The UE of claim 8, wherein duration of clear channel assessment (CCA) detection of Cat2 LBT comprises: 16 us, or, 25 us, or, 34 us, or, 43 us.

10. The UE of claim 7, wherein the LBT mechanism comprises: Cat2 LBT, or, Cat4 LBT.

11. The UE of claim 10, wherein duration of clear channel assessment (CCA) detection of Cat2 LBT comprises: 16 us, or, 25 us, or, 34 us, or, 43 us.

12. The UE of claim 10, wherein parameter of Cat4 LBT comprises at least one of: LBT priority level, a minimum value of Contention window size, a maximum value of contention window size, channel occupancy time.

13. A non-transitory storage medium, comprising a stored program that, when executed by a processor, causes the processor to perform the method comprising:
- receiving a listen-before-talk (LBT) mechanism; and
- transmitting a LBT failure indication from physical layer to higher layers for informing LBT failure, by a User equipment (UE), after performing the LBT mechanism failure prior to uplink (UL) transmission, based on the received LBT mechanism;
- wherein, UL transmission comprises at least one of the following: preamble transmission, or Mgs1 transmission, or physical uplink shared channel (PUSCH) transmission;
- wherein, for the case of LBT failure for UL transmission including Mgs1 transmission or preamble transmission comprises:
- if LBT failure indication is not received from lower layers for preamble transmission, Power Ramping counter is increased; or
- if LBT failure indication is received from lower layers for preamble transmission, Power Ramping counter is not increased.

14. The non-transitory storage medium of claim 13, wherein, if preamble is not transmitted due to LBT failure, comprises one of the following:
- LBT mechanism for next preamble transmission is the same as that of previous preamble transmission; or
- contention window size for next preamble transmission is shorter than that of previous preamble transmission; or
- LBT mechanism for next preamble transmission uses Cat2 LBT; or
- transmission power for next preamble transmission is same as that of previous preamble transmission.

15. The non-transitory storage medium of claim 14, wherein duration of clear channel assessment (CCA) detection of Cat2 LBT comprises: 16 us, or, 25 us, or, 34 us, or, 43 us.

16. The non-transitory storage medium of claim 13, wherein the LBT mechanism comprises: Cat2 LBT, or, Cat4 LBT.

17. The non-transitory storage medium of claim 16, wherein duration of clear channel assessment (CCA) detection of Cat2 LBT comprises: 16 us, or, 25 us, or, 34 us, or, 43 us.

18. The non-transitory storage medium of claim 16, wherein parameter of Cat4 LBT comprises at least one of: LBT priority level, a minimum value of Contention window size, a maximum value of contention window size, channel occupancy time.

* * * * *

UNITED STATES PATENT AND TRADEMARK OFFICE
CERTIFICATE OF CORRECTION

PATENT NO. : 11,533,751 B2
APPLICATION NO. : 17/175516
DATED : December 20, 2022
INVENTOR(S) : Ling Yang et al.

It is certified that error appears in the above-identified patent and that said Letters Patent is hereby corrected as shown below:

In the Specification

Column 2, Line 39, delete "Mgs0" and insert -- Msg0 --.

Column 2, Line 42, delete "Mgs1" and insert -- Msg1 --.

Column 2, Line 44, delete "Mgs2" and insert -- Msg2 --.

Column 2, Line 45, delete "Mgs3" and insert -- Msg3 --.

Column 2, Line 46, delete "Mgs4" and insert -- Msg4 --.

Column 3, Line 6, delete "Mgs1" and insert -- Msg1 --.

Column 3, Line 20, delete "Mgs1" and insert -- Msg1 --.

Column 4, Line 13, delete "Mgs1" and insert -- Msg1 --.

Column 4, Line 30, delete "Mgs1" and insert -- Msg1 --.

Column 4, Line 41, delete "Mgs2" and insert -- Msg2 --.

Column 4, Line 42, delete "Mgs2" and insert -- Msg2 --.

Column 4, Line 45, delete "Mgs2" and insert -- Msg2 --.

Column 4, Line 48, delete "Mgs2" and insert -- Msg2 --.

Column 4, Line 49, delete "Mgs2" and insert -- Msg2 --.

Signed and Sealed this
Thirtieth Day of May, 2023

Katherine Kelly Vidal
*Director of the United States Patent and Trademark Office*

CERTIFICATE OF CORRECTION (continued)
U.S. Pat. No. 11,533,751 B2

Column 4, Line 52, delete "Mgs1" and insert -- Msg1 --.

Column 4, Line 53, delete "Mgs2" and insert -- Msg2 --.

Column 4, Line 56, delete "Mgs2" and insert -- Msg2 --.

Column 4, Line 59, delete "Mgs2" and insert -- Msg2 --.

Column 4, Line 61, delete "Mgs2" and insert -- Msg2 --.

Column 4, Line 62, delete "Mgs2" and insert -- Msg2 --.

Column 4, Line 64, delete "Mgs2" and insert -- Msg2 --.

Column 5, Line 5, delete "Mgs2" and insert -- Msg2 --.

Column 5, Line 9, delete "Mgs2" and insert -- Msg2 --.

Column 5, Line 10, delete "Mgs1" and insert -- Msg1 --.

Column 5, Line 11, delete "Mgs2" and insert -- Msg2 --.

Column 5, Line 14, delete "Mgs2" and insert -- Msg2 --.

Column 5, Line 27, delete "Mgs2" and insert -- Msg2 --.

Column 5, Line 31, delete "Mgs2" and insert -- Msg2 --.

Column 6, Line 13, delete "Mgs0" and insert -- Msg0 --.

Column 6, Line 16, delete "Mgs1" and insert -- Msg1 --.

Column 6, Line 18, delete "Mgs2" and insert -- Msg2 --.

Column 6, Line 19, delete "Mgs3" and insert -- Msg3 --.

Column 6, Line 20, delete "Mgs4" and insert -- Msg4 --.

Column 6, Line 49, delete "Mgs1" and insert -- Msg1 --.

Column 6, Line 62, delete "Mgs1" and insert -- Msg1 --.

Column 7, Line 58, delete "Mgs1" and insert -- Msg1 --.

Column 8, Line 9, delete "Mgs1" and insert -- Msg1 --.

CERTIFICATE OF CORRECTION (continued)
U.S. Pat. No. 11,533,751 B2

Column 8, Line 22, delete "Mgs2" and insert -- Msg2 --.

Column 8, Line 24, delete "Mgs2" and insert -- Msg2 --.

Column 8, Line 27, delete "Mgs2" and insert -- Msg2 --.

Column 8, Line 29, delete "Mgs2" and insert -- Msg2 --.

Column 8, Line 31, delete "Mgs2" and insert -- Msg2 --.

Column 8, Line 33, delete "Mgs1" and insert -- Msg1 --.

Column 8, Line 34, delete "Mgs2" and insert -- Msg2 --.

Column 8, Line 38, delete "Mgs2" and insert -- Msg2 --.

Column 8, Line 41, delete "Mgs2" and insert -- Msg2 --.

Column 8, Line 42, delete "Mgs2" and insert -- Msg2 --.

Column 8, Line 44, delete "Mgs2" and insert -- Msg2 --.

Column 8, Line 46, delete "Mgs2" and insert -- Msg2 --.

Column 8, Line 55, delete "Mgs2" and insert -- Msg2 --.

Column 8, Line 61, delete "Mgs2" and insert -- Msg2 --.

Column 8, Line 62, delete "Mgs1" and insert -- Msg1 --.

Column 8, Line 63, delete "Mgs2" and insert -- Msg2 --.

Column 8, Line 66, delete "Mgs2" and insert -- Msg2 --.

Column 9, Line 11, delete "Mgs2" and insert -- Msg2 --.

Column 9, Line 16, delete "Mgs2" and insert -- Msg2 --.

Column 10, Line 1, delete "Mgs0" and insert -- Msg0 --.

Column 10, Line 4, delete "Mgs1" and insert -- Msg1 --.

Column 10, Line 6, delete "Mgs2" and insert -- Msg2 --.

Column 10, Line 7, delete "Mgs3" and insert -- Msg3 --.

CERTIFICATE OF CORRECTION (continued)
U.S. Pat. No. 11,533,751 B2

Column 10, Line 8, delete "Mgs4" and insert -- Msg4 --.

Column 10, Line 41, delete "Mgs1" and insert -- Msg1 --.

Column 10, Line 56, delete "Mgs1" and insert -- Msg1 --.

Column 11, Line 61, delete "Mgs1" and insert -- Msg1 --.

Column 12, Line 16, delete "Mgs1" and insert -- Msg1 --.

Column 12, Line 28, delete "Mgs2" and insert -- Msg2 --.

Column 12, Line 30, delete "Mgs2" and insert -- Msg2 --.

Column 12, Line 33, delete "Mgs2" and insert -- Msg2 --.

Column 12, Line 36, delete "Mgs2" and insert -- Msg2 --.

Column 12, Line 38, delete "Mgs2" and insert -- Msg2 --.

Column 12, Line 40, delete "Mgs1" and insert -- Msg1 --.

Column 12, Line 41, delete "Mgs2" and insert -- Msg2 --.

Column 12, Line 44, delete "Mgs2" and insert -- Msg2 --.

Column 12, Line 47, delete "Mgs2" and insert -- Msg2 --.

Column 12, Line 49, delete "Mgs2" and insert -- Msg2 --.

Column 12, Line 51, delete "Mgs2" and insert -- Msg2 --.

Column 12, Line 52, delete "Mgs2" and insert -- Msg2 --.

Column 12, Line 64, delete "Mgs2" and insert -- Msg2 --.

Column 13, Line 3, delete "Mgs2" and insert -- Msg2 --.

Column 13, Line 3, delete "Mgs1" and insert -- Msg1 --.

Column 13, Line 4, delete "Mgs2" and insert -- Msg2 --.

Column 13, Line 10, delete "Mgs2" and insert -- Msg2 --.

Column 13, Line 23, delete "Mgs2" and insert -- Msg2 --.

CERTIFICATE OF CORRECTION (continued)
U.S. Pat. No. 11,533,751 B2

Column 13, Line 29, delete "Mgs2" and insert -- Msg2 --.

Column 13, Line 67, delete "follows" and insert -- follows: --.

Column 16, Line 25, delete "Mgs0" and insert -- Msg0 --.

Column 16, Line 27, delete "Mgs1" and insert -- Msg1 --.

Column 16, Line 29, delete "Mgs2" and insert -- Msg2 --.

Column 16, Line 30, delete "Mgs3" and insert -- Msg3 --.

Column 16, Line 31, delete "Mgs4" and insert -- Msg4 --.

Column 17, Line 22, delete "Mgs1" and insert -- Msg1 --.

Column 17, Line 23, delete "Mgs1" and insert -- Msg1 --.

Column 17, Line 27, delete "Mgs1" and insert -- Msg1 --.

Column 17, Line 40, delete "Mgs1" and insert -- Msg1 --.

Column 18, Line 60, delete "Mgs1" and insert -- Msg1 --.

Column 19, Line 21, delete "Mgs1" and insert -- Msg1 --.

Column 19, Line 35, delete "Mgs2" and insert -- Msg2 --.

Column 19, Line 40, delete "Mgs2" and insert -- Msg2 --.

Column 19, Line 41, delete "Mgs2" and insert -- Msg2 --.

Column 19, Line 44, delete "Mgs2" and insert -- Msg2 --.

Column 19, Line 47, delete "Mgs2" and insert -- Msg2 --.

Column 19, Line 49, delete "Mgs2" and insert -- Msg2 --.

Column 19, Line 55, delete "Mgs1" and insert -- Msg1 --.

Column 19, Line 56, delete "Mgs2" and insert -- Msg2 --.

Column 19, Line 59, delete "Mgs2" and insert -- Msg2 --.

Column 19, Line 62, delete "Mgs2" and insert -- Msg2 --.

Column 19, Line 64, delete "Mgs2" and insert -- Msg2 --.

Column 19, Line 65, delete "Mgs2" and insert -- Msg2 --.

Column 19, Line 67, delete "Mgs2" and insert -- Msg2 --.

Column 20, Line 10, delete "Mgs2" and insert -- Msg2 --.

Column 20, Line 23, delete "Mgs2" and insert -- Msg2 --.

Column 20, Line 24, delete "Mgs1" and insert -- Msg1 --.

Column 20, Line 25, delete "Mgs2" and insert -- Msg2 --.

Column 20, Line 28, delete "Mgs4" and insert -- Msg4 --.

Column 20, Line 30, delete "Mgs3" and insert -- Msg3 --.

Column 20, Line 30, delete "Mgs4" and insert -- Msg4 --.

Column 20, Line 35, delete "escribed" and insert -- described --.

Column 20, Line 39, delete "Mgs3" and insert -- Msg3 --.

Column 20, Line 39, delete "Mgs2" and insert -- Msg2 --.

Column 20, Line 52, delete "Mgs2" and insert -- Msg2 --.

Column 20, Line 56, delete "Mgs2" and insert -- Msg2 --.

Column 32, Line 64, delete "Mgs2" and insert -- Msg2 --.

Column 37, Line 48, delete "access).)" and insert -- access). --.

Column 41, Line 11, delete "Mgs0" and insert -- Msg0 --.

Column 41, Line 14, delete "Mgs1" and insert -- Msg1 --.

Column 41, Line 16, delete "Mgs2" and insert -- Msg2 --.

Column 41, Line 17, delete "Mgs3" and insert -- Msg3 --.

Column 41, Line 18, delete "Mgs4" and insert -- Msg4 --.

Column 41, Line 50, delete "Mgs1" and insert -- Msg1 --.

Column 41, Line 64, delete "Mgs1" and insert -- Msg1 --.

Column 43, Line 7, delete "Mgs1" and insert -- Msg1 --.

Column 43, Line 31, delete "Mgs1" and insert -- Msg1 --.

Column 43, Line 50, delete "Mgs2" and insert -- Msg2 --.

Column 43, Line 53, delete "Mgs2" and insert -- Msg2 --.

Column 43, Line 57, delete "Mgs2" and insert -- Msg2 --.

Column 43, Line 59, delete "Mgs2" and insert -- Msg2 --.

Column 43, Line 61, delete "Mgs2" and insert -- Msg2 --.

Column 43, Line 63, delete "Mgs1" and insert -- Msg1 --.

Column 43, Line 64, delete "Mgs2" and insert -- Msg2 --.

Column 43, Line 67, delete "Mgs2" and insert -- Msg2 --.

Column 44, Line 3, delete "Mgs2" and insert -- Msg2 --.

Column 44, Line 5, delete "Mgs2" and insert -- Msg2 --.

Column 44, Line 6, delete "Mgs2" and insert -- Msg2 --.

Column 44, Line 8, delete "Mgs1" and insert -- Msg1 --.

Column 44, Line 22, delete "Mgs2" and insert -- Msg2 --.

Column 44, Line 34, delete "Mgs2" and insert -- Msg2 --.

Column 44, Line 34, delete "Mgs1" and insert -- Msg1 --.

Column 44, Line 35, delete "Mgs2" and insert -- Msg2 --.

Column 44, Line 39, delete "Mgs2" and insert -- Msg2 --.

Column 44, Line 51, delete "Mgs2" and insert -- Msg2 --.

Column 44, Line 56, delete "Mgs2" and insert -- Msg2 --.

Column 47, Line 54, delete "Mgs1" and insert -- Msg1 --.

CERTIFICATE OF CORRECTION (continued)
U.S. Pat. No. 11,533,751 B2

Column 48, Line 10, delete "Mgs1" and insert -- Msg1 --.

Column 48, Line 25, delete "Mgs2" and insert -- Msg2 --.

Column 48, Line 27, delete "Mgs2" and insert -- Msg2 --.

Column 48, Line 33, delete "Mgs2" and insert -- Msg2 --.

Column 48, Line 36, delete "Mgs2" and insert -- Msg2 --.

Column 48, Line 37, delete "Mgs2" and insert -- Msg2 --.

Column 48, Line 40, delete "Mgs1" and insert -- Msg1 --.

Column 48, Line 41, delete "Mgs2" and insert -- Msg2 --.

Column 48, Line 44, delete "Mgs2" and insert -- Msg2 --.

Column 48, Line 47, delete "Mgs2" and insert -- Msg2 --.

Column 48, Line 48, delete "Mgs2" and insert -- Msg2 --.

Column 48, Line 50, delete "Mgs2" and insert -- Msg2 --.

Column 48, Line 52, delete "Mgs2" and insert -- Msg2 --.

Column 48, Line 66, delete "Mgs2" and insert -- Msg2 --.

Column 49, Line 6, delete "Mgs2" and insert -- Msg2 --.

Column 49, Line 7, delete "Mgs1" and insert -- Msg1 --.

Column 49, Line 7, delete "Mgs2" and insert -- Msg2 --.

Column 49, Line 14, delete "Mgs2" and insert -- Msg2 --.

Column 49, Line 26, delete "Mgs2" and insert -- Msg2 --.

Column 49, Line 34, delete "Mgs2" and insert -- Msg2 --.

Column 50, Line 24, delete "Mgs0" and insert -- Msg0 --.

Column 50, Line 27, delete "Mgs1" and insert -- Msg1 --.

Column 50, Line 29, delete "Mgs2" and insert -- Msg2 --.

CERTIFICATE OF CORRECTION (continued)
U.S. Pat. No. 11,533,751 B2

Column 50, Line 30, delete "Mgs3" and insert -- Msg3 --.

Column 50, Line 31, delete "Mgs4" and insert -- Msg4 --.

Column 50, Line 62, delete "Mgs1" and insert -- Msg1 --.

Column 51, Line 10, delete "Mgs1" and insert -- Msg1 --.

Column 52, Line 18, delete "Mgs1" and insert -- Msg1 --.

Column 52, Line 39, delete "Mgs1" and insert -- Msg1 --.

Column 52, Line 52, delete "Mgs2" and insert -- Msg2 --.

Column 52, Line 53, delete "Mgs2" and insert -- Msg2 --.

Column 52, Line 58, delete "Mgs2" and insert -- Msg2 --.

Column 52, Line 61, delete "Mgs2" and insert -- Msg2 --.

Column 52, Line 62, delete "Mgs2" and insert -- Msg2 --.

Column 52, Line 65, delete "Mgs1" and insert -- Msg1 --.

Column 52, Line 66, delete "Mgs2" and insert -- Msg2 --.

Column 53, Line 2, delete "Mgs2" and insert -- Msg2 --.

Column 53, Line 5, delete "Mgs2" and insert -- Msg2 --.

Column 53, Line 6, delete "Mgs2" and insert -- Msg2 --.

Column 53, Line 8, delete "Mgs2" and insert -- Msg2 --.

Column 53, Line 10, delete "Mgs2" and insert -- Msg2 --.

Column 53, Line 22, delete "Mgs2" and insert -- Msg2 --.

Column 53, Line 28, delete "Mgs2" and insert -- Msg2 --.

Column 53, Line 29, delete "Mgs1" and insert -- Msg1 --.

Column 53, Line 30, delete "Mgs2" and insert -- Msg2 --.

Column 53, Line 35, delete "Mgs2" and insert -- Msg2 --.

CERTIFICATE OF CORRECTION (continued)
U.S. Pat. No. 11,533,751 B2

Column 53, Line 47, delete "Mgs2" and insert -- Msg2 --.

Column 53, Line 54, delete "Mgs2" and insert -- Msg2 --.

In the Claims

Column 54, Claim 1, Line 56, delete "Mgs1" and insert -- Msg1 --.

Column 54, Claim 1, Line 60, delete "Mgs1" and insert -- Msg1 --.

Column 55, Claim 6, Line 22, delete "Contention" and insert -- contention --.

Column 55, Claim 7, Line 35, delete "Mgs1" and insert -- Msg1 --.

Column 55, Claim 7, Line 39, delete "Mgs1" and insert -- Msg1 --.

Column 56, Claim 12, Line 6, delete "Contention" and insert -- contention --.

Column 56, Claim 13, Line 19, delete "Mgs1" and insert -- Msg1 --.

Column 56, Claim 13, Line 23, delete "Mgs1" and insert -- Msg1 --.

Column 56, Claim 18, Line 58, delete "Contention" and insert -- contention --.